United States Patent
Lee

(10) Patent No.: US 10,942,848 B2
(45) Date of Patent: Mar. 9, 2021

(54) APPARATUS AND METHOD FOR CHECKING VALID DATA IN MEMORY SYSTEM

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 16/550,364

(22) Filed: Aug. 26, 2019

(65) Prior Publication Data
US 2020/0226058 A1     Jul. 16, 2020

(30) Foreign Application Priority Data

Jan. 11, 2019 (KR) .................. 10-2019-0003824

(51) Int. Cl.
G06F 12/02      (2006.01)
G06F 12/1009    (2016.01)

(52) U.S. Cl.
CPC ...... *G06F 12/0246* (2013.01); *G06F 12/0253* (2013.01); *G06F 12/1009* (2013.01); *G06F 2212/7209* (2013.01)

(58) Field of Classification Search
None
See application file for complete search history.

(56) References Cited

U.S. PATENT DOCUMENTS

2009/0198947 A1*  8/2009  Khmelnitsky ...... G06F 12/0246
                                                 711/202
2015/0261671 A1*  9/2015  Chu ................... G06F 12/0246
                                                 711/103

FOREIGN PATENT DOCUMENTS

KR   10-2015-0013235      2/2015

* cited by examiner

*Primary Examiner* — Kevin Verbrugge
(74) *Attorney, Agent, or Firm* — IP & T Group LLP

(57) ABSTRACT

A memory system includes a memory device including plural memory blocks storing plural pieces of data classified by a first attribute and a second attribute different from the first attribute, and a controller configured to determine whether each data stored in each page in a first part of a target memory block for garbage collection in the memory device has either the first attribute or the second attribute, to determine that all data stored in a second part of the memory block has one of the first attribute and the second attribute, based on a first attribute page count of the memory block and the number of pages storing data of the first attribute in the first part of the memory block, and to migrate data having one of the first attribute and the second attribute to another memory block.

20 Claims, 18 Drawing Sheets

APPARATUS AND METHOD FOR CHECKING VALID DATA IN MEMORY SYSTEM

CROSS-REFERENCE TO RELATED APPLICATION

This patent application claims priority under 35 U.S.C. § 119(a) to Korean Patent Application No. 10-2019-0003824, filed on Jan. 11, 2019, the entire disclosure of which is incorporated herein by reference.

TECHNICAL FIELD

Various embodiments of the invention relate to a memory system, and more particularly, to an apparatus and a method for reducing a time for checking valid data subject to garbage collection in a memory block of a nonvolatile memory device.

BACKGROUND

Recently, the paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a universal serial bus (USB) memory device, a memory card having various interfaces, a solid state drive (SSD) or the like.

BRIEF DESCRIPTION OF THE DRAWINGS

The description herein makes reference to the accompanying drawings wherein like reference numerals refer to like parts throughout the figures, and wherein.

DETAILED DESCRIPTION

Figure 1:
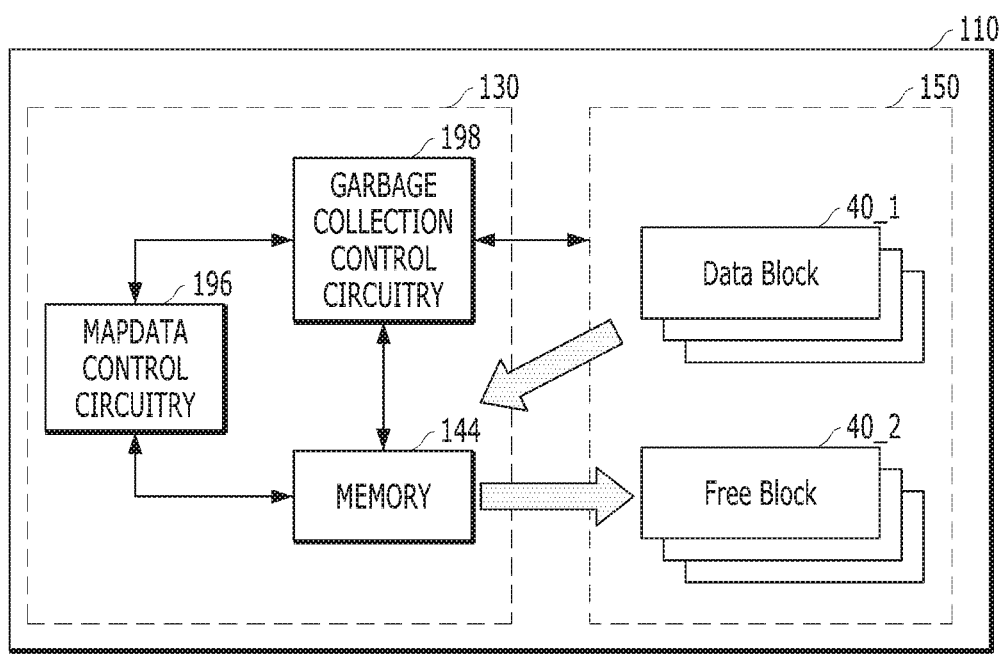
FIG. 1 illustrates garbage collection in a memory system in accordance with an embodiment of the disclosure.

Various embodiments of the disclosure are described below in more detail with reference to the accompanying drawings. Elements and features of the disclosure, however, may be configured or arranged differently to form other embodiments, which may be variations of any of the disclosed embodiments. Thus, the present invention is not limited to the embodiments set forth herein. Rather, the described embodiments are provided so that this disclosure is thorough and complete and fully conveys the scope of the disclosure to those skilled in the art to which this invention pertains. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure may provide a memory system, a data processing system, and an operation process or a method, which is may quickly and reliably process data into a memory device by reducing operational complexity and performance degradation of the memory system, thereby enhancing usage efficiency of the memory device.

Embodiments of the disclosure may provide an apparatus and a method which is capable of reducing a time spent on whether to search for valid data, without an operation to confirm whether data is valid, when a preset relationship between a valid page count (VPC) and the number of valid data or invalid data is established in a process of determining validity of data in a memory block that is selected as a target of garbage collection in a memory device.

Embodiments of the disclosure may reduce resources consumed in a process of determining whether each piece of data is valid for garbage collection in a memory device including a block capable of storing voluminous data, so that it is possible to provide a method and apparatus capable of enhancing operational efficiency and avoiding latency due to a background operation of the memory system while a large amount of data is handled in a host or a data processing system using the memory system.

In an embodiment, a memory system may include a memory device including plural memory blocks storing plural pieces of data classified by a first attribute and a second attribute different from the first attribute; and a controller configured to determine whether each data stored in each page in a first part of a target memory block for garbage collection in the memory device has either the first attribute or the second attribute, to determine that all data stored in a second part of the memory block has one of the first attribute and the second attribute, based on a first attribute page count of the memory block and the number of pages storing data of the first-attribute in the first part of the memory block, and to migrate data having one of the first attribute and the second attribute to another memory block. The memory system might omit an operation for checking which first or second-attribute data stored at each page of the second part have.

By way of example but not limitation, the first attribute may indicate that a piece of data is valid, i.e., the piece of data is the latest corresponding to a specific logical address, and the second attribute can indicate that the piece of data is invalid, i.e., the piece of data is not the latest corresponding to the specific logical address so that the piece of data is not used any longer.

In another example, the first attribute indicates that a piece of data is invalid, and the second attribute indicates that the piece of data is valid.

When a value of subtracting the number of pages from the first attribute page count becomes zero at a specific page in the memory block, the next page to the last page belong to the second part.

When a ratio of a value of subtracting the page count from the first-attribute page count to the number of remaining pages in the memory block is less than a preset threshold, the next page to the last page belong to the second part. The preset threshold is 1%.

The memory block is split into the first part and the second part, the first part includes the first page of the memory block, and the second part includes the last page of the memory block.

In an example, the first attribute indicates that a piece of data is invalid when a valid page count (VPC) of the memory block is more than a half (½) of a total page number of the memory block.

In another example, the first attribute indicates that a piece of data is valid when a valid page count (VPC) of the memory block is less than a half (½) of a total page number of the memory block.

The controller is configured to check whether two different types of addresses regarding each data stored at a page in the first part are associated with each other to determine that each data has either the first attribute or the second attribute.

In another embodiment, a method for operating a memory system can include checking whether two different types of addresses regarding each data stored at a page in a first part of a memory block in a memory device are associated with each other to determine whether a first or a second attribute data is stored in each page; determining that all data stored in a second part of the memory block has one of the first attribute and the second attribute data, based on a first-attribute page count of the memory block and the number of pages storing data of the first attribute in the first part of the memory block; and migrating data having one of the first-attribute and the second-attribute to another memory block.

In an example, the first attribute indicates that a piece of data is valid, and the second attribute indicates that the piece of data is invalid.

In another example, the first attribute indicates that a piece of data is invalid, and the second attribute indicates that the piece of data is valid.

The method may further include a step of including the next page to the last page in the second part, when a value of subtracting the number of pages from the first attribute page count becomes zero at a specific page in the memory block.

The method may further include a step of including the next page to the last page in the second part, when a ratio of a value of subtracting the page count from the first-attribute page count to the number of remaining pages in the memory block becomes lower than a preset threshold.

By way of example but not limitation, the preset threshold is 1%.

The memory block is split into the first part and the second part, the first part includes the first page of the memory block, and the second part includes the last page of the memory block.

The first attribute indicates that a piece of data is invalid when a valid page count (VPC) of the memory block is more than a half (½) of a total page number of the memory block.

The first attribute indicates that a piece of data is valid when a valid page count (VPC) of the memory block is less than a half (½) of a total page number of the memory block.

In another embodiment, an apparatus for controlling a memory system including at least one processor and at least one memory including computer program code. The at least one memory and the computer program code are configured, with the at least one processor, to cause the apparatus to: check whether two different types of addresses regarding each data stored at a page in a first part of a memory block in a memory device are associated with each other to determine which of a first attribute data or a second attribute data is stored in each page; determine that all data stored in a second part of the memory block has one of the first attribute and the second attribute, based on a first attribute page count of the memory block and the number of pages storing data of the first attribute in the first part of the memory block; and migrate data having one of the first attribute and the second attribute to another memory block.

In another embodiment, a memory system can include a memory device including a plurality of memory blocks; and a controller suitable for: sequentially determining validity of each of multiple pages in a memory block among the plurality of memory blocks; determining whether a probability of invalidity of some pages among the multiple pages is greater than a threshold; determining that remaining pages among the multiple pages are valid with a probability of validity, when the probability of invalidity of the some pages is greater than the threshold; moving data of the remaining pages to another memory block among the plurality of memory blocks.

In another embodiment, a method for controlling a memory system including at least one processor and at least one memory including computer program code can include checking whether two different types of addresses regarding each data stored at a page in a first part of a memory block in a memory device are associated with each other to determine which of a first attribute data or a second attribute data is stored in each page; determining that all data stored in a second part of the memory block has one of the first attribute and the second attribute, based on a first attribute page count of the memory block and the number of pages storing data of the first attribute in the first part of the memory block; and migrating data having one of the first attribute and the second attribute to another memory block.

Embodiments of the disclosure will now be described in detail with reference to the accompanying drawings, wherein like numbers reference like elements.

FIG. 1 illustrates an apparatus for searching for valid data and performing garbage collection in a memory system 110 in accordance with an embodiment of the disclosure. The memory system 110 may include a controller 130 and a memory device 150. The memory system 110 may be engaged with another device, e.g., a computing device.

Referring to FIG. 1, the controller 130 may perform garbage collection (GC) through a garbage collection control circuitry 198 as a background operation. For example, the garbage collection may be performed by the memory system 110 itself without commands or instructions received from a host (e.g., a host 102 of FIG. 2). The controller 130 may read user data from a plurality of data blocks 40_1 of the memory device 150. Further, the controller 130 may temporarily store the user data in the memory 144 disposed within, or directly engaged with and controlled by, the controller 130, and program the user data loaded in the memory 144 into a free block 40_2 of the memory device 150. The plurality of data blocks 40_1 may include blocks that can no longer be programmed with new data without an erase operation.

Specifically, the garbage collection control circuitry 198 may select at least one of the plurality of data blocks 40_1 as a victim block. In addition, the garbage collection control circuitry 198 searches for and extracts valid data in a memory block selected as a victim block, and moves valid data to the free block 40_2 as a target block. Data determined to be no longer valid in at least one victim block among the plurality of data blocks 40_1 may be discarded (i.e., it may not be moved to the free block 40_2). When the valid data stored in the data block 40_1 is moved to the free block 40_2, the controller 130 considers that the data block 40_1 has no more valid data. Thereafter, when it is necessary to program new data in the specific block 40_1, all the data stored in the corresponding data block 40_1 may be erased.

To perform the garbage collection, the controller 130 may distinguish valid data from invalid data in the data block 40_1 selected as a victim block. Information regarding a valid page count (VPC) corresponding to the data block 40_1 may indicate an amount of valid data or valid pages in the data block 40_1, but does not indicate which data or which page is valid or invalid. When a piece of data is valid, the piece of data is the latest data corresponding to a specific logical address. When the host 102 requests data corresponding to the specific logical address, the memory system 110 should output the latest version data in response to the request of the host and the specific logical address. The latest version data may be referred as to a valid data. When a piece of data is invalid, the piece of data is not the latest corresponding to the specific logical address so that the piece of data is used no longer. Accordingly, the controller 130 may use operational information including the map data to determine which data or which page is valid or invalid. Embodiments of the disclosure may easily distinguish valid data to be stored in the free block 40_2 for garbage collection, so that resources (e.g., a time and a power) for garbage collection may be reduced.

According to an embodiment, the controller 130 may include a map data control circuitry 196. The map data control circuitry 196 may generate and control a piece of map data corresponding to a piece of data stored in the data block 40_1. For example, the map data includes first address information (e.g., logical to physical address map table or L2P map table) for translating a logical address into a physical address and second address information (e.g., physical to logical address map table or P2L map table) for translating a physical address into a logical address. The map data control circuitry 196 may generate or update map data (e.g., first address information and second address information) which is associated with a piece of data whenever the piece of data is written in a memory block in the memory device 150. The map data generated or updated by the map data control circuitry 196 may be stored in a memory block in the memory device 150. According to an embodiment, the map data may be stored in the same memory block with user data, or may be stored in a memory block which is physically separated from a memory block storing user data.

The garbage collection control circuitry 198 may select a victim block among the plurality of data blocks 40_1 in the memory device 150. In an example, the garbage collection control circuitry 198 may search for valid data in the memory block selected as a victim block, load searched valid data into the memory 144, and then move loaded data in the memory 144 to the free block 40_1. In another example, the garbage collection control circuitry 198 may load all of the data of the selected block into the memory 144, distinguish valid data from invalid data in loaded data and then move only valid data to the free block 40_1.

Whether or not the data stored in a memory block selected by the garbage collection control circuitry 198 is valid may be determined through the map data control circuitry 196. After the map data control circuitry 196 loads map data for the memory block selected by the garbage collection control circuitry 198, the map data control circuitry 196 may check whether two different pieces of address information for each data stored in the memory block are matched with each other. For example, an amount of two different pieces of address information may be very large. The map data control circuitry 196 may store and update the map data including two different pieces of address information in a part of the memory 144.

In order to determine validity of each data, the map data control circuitry 196 may check whether two different pieces of address information (e.g., L2P, P2L) are matched with each other. Specifically, in order to confirm whether a logical address (e.g., an address used by a host) of data and a physical address (e.g., a specific location of data stored in a specific page in a specific block) are connected to each other, the map data control circuitry 196 may use second address information (e.g., P2L map table) for data to recognize a logical address of the data. After the logical address is found, the map data control circuitry 196 may check a physical address corresponding to the logical address based on first address information (e.g., L2P map table). The physical address of the data should be the same as the physical address obtained through two-times address translation processes based on the P2L map table and the L2P map table. For example, if a logical address of data stored in a current location is found through the second address information (e.g., P2L map table) and a physical address corresponding to the logical address does not indicate the current location of the data, the data may not be considered the latest version of data, i.e., that data is a previous one before being updated so that the data is no longer valid and used. If the physical address corresponding to the logical address indicates the current location, the data stored at the current location may be the latest version of data (i.e., valid data).

Data may be sequentially programmed in the data block 40_1. When data is programmed on the last page of a memory block, the memory block may become a closed state in which the new data may no longer be programmed therein, from an open state where new data may be programmed therein. When a specific memory block of the data blocks 40_1 is in the closed state, the map data control circuitry 196 may check how many valid data are stored in the memory block to obtain a valid page count (VPC) of the memory block.

The garbage collection control circuitry 198 may prevent the map data control circuitry 196 from determining data validity for data stored in at least some areas of the victim block, based on the valid page count (VPC). In other words, the controller 130 stops searching for valid data in at least some parts of the victim block, thereby reducing resources (e.g., a time) required for garbage collection. In another example, the garbage collection control circuitry 198 may avoid that the map data control circuitry 196 check data validity for all data stored in a victim block, based on an invalid page count (IPC). The map data control circuitry 196 may not check data validity for data stored in at least a part of the victim block based on the invalid page count (IPC), not the valid page count (VPC).

As used in the disclosure, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processors)/software including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

Figure 2:
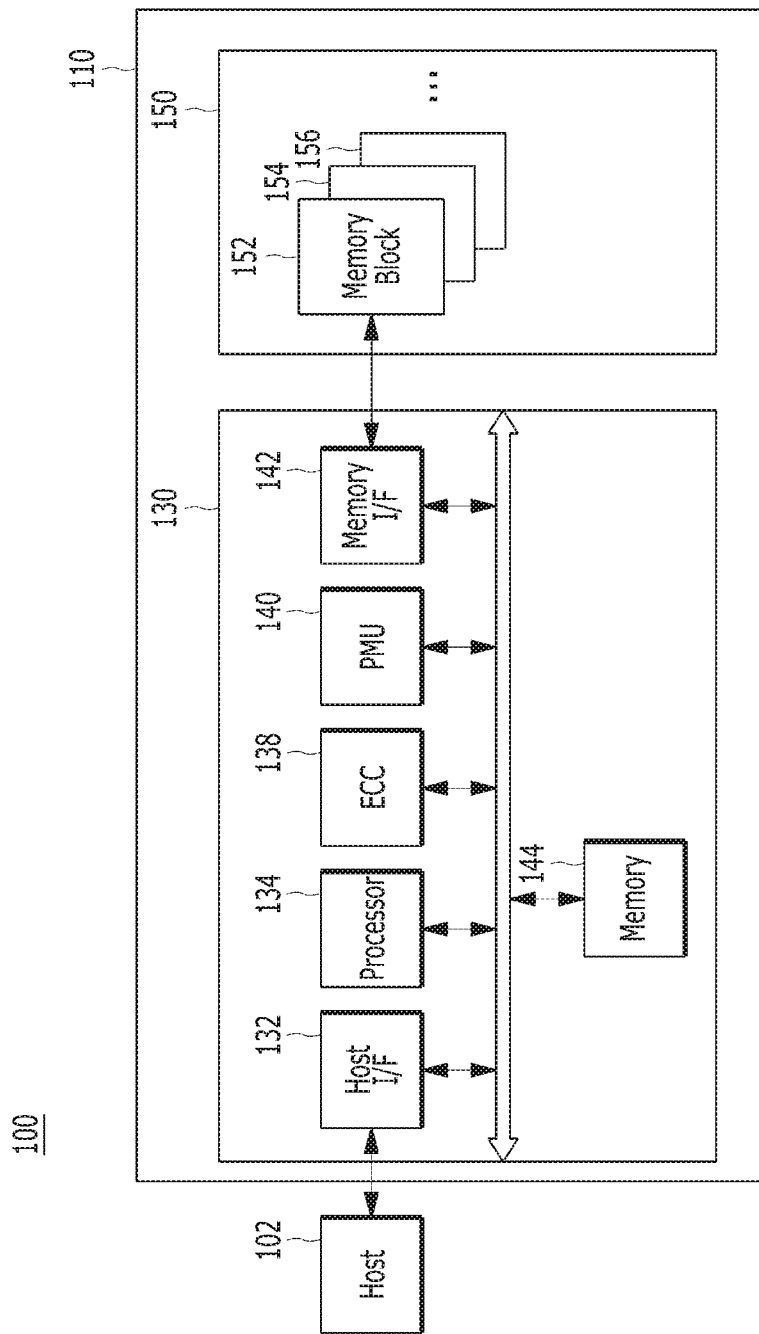
FIG. 2 shows a data processing system including a memory system in accordance with an embodiment of the disclosure.

FIG. 2 illustrates a data processing system 100 in accordance with an embodiment of the disclosure. Referring to FIG. 2, the data processing system 100 may include a host 102 engaged or interlocked with a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS may provide interoperability between the host 102 engaged with the memory system 110 and the user needing and using the memory system 110. The OS may support functions and operations corresponding to users' requests. By way of example but not limitation, the OS may be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described later, in reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated into an SSD for improving an operation speed. When the memory system 110 is used as an SSD, the operating speed of the host 102 connected to the memory system 110 may be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (e.g., SM, SMC), a memory stick, a multimedia card (e.g., MMC, RS-MMC, MMCmicro), a secure digital (SD) card (e.g., SD, miniSD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through a firmware called a host interface layer (HIL).

The ECC component 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and store the encoded data in a memory device 150. The ECC decoder may detect and correct errors contained in a data read from the memory device 150 when the controller 130 reads the data stored in the memory device 150. In other words, after performing error correction decoding on the data read from the memory device 150, the ECC component 138 may determine whether the error correction decoding has succeeded and output an instruction signal (e.g., a correction success signal or a correction fail signal). The ECC component 138 may use the parity bit which is generated during the ECC encoding process, for correcting the error bit of the read data. When the number of the error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include all circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a Flash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 may store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 may control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL), The FTL may perform an operation as an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

When performing an operation requested from the host 102 in the memory device 150, the controller 130 uses the processor 134. The processor 134 may handle instructions or commands corresponding to a command received from the host 102. The controller 130 may perform a foreground operation such as a command operation, corresponding to a command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation includes an operation of copying and storing data stored in a memory block among the memory blocks 152, 154, 156 in the memory device 150 to another memory block, e.g., a garbage collection (GC) operation. The background operation may include an operation of moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In accordance with an embodiment, the garbage collection control circuitry 198 and the map data control circuitry 196 shown in FIG. 1 may be implemented through at least one processor 134 and at least one memory 144 in the controller 130 described in FIG. 2. For example, when the garbage collection control circuitry 198 and the map data control circuitry 196 shown in FIG. 1 includes firmware, the firmware may be performed by at least one processor 134 and loaded in at least one memory 144 in the controller 130 described in FIG. 2.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) among a plurality of channels (or ways) for connecting the controller 130 to a plurality of memory dies included in the memory 150 is/are proper or appropriate for performing each operation. The controller 130 may transmit data or instructions via determined channels or ways for performing each operation. The plurality of memory dies included in the memory 150 may transmit an operation result via the same channels or ways, respectively, after each operation is complete. Then, the controller 130 may transmit a response or an acknowledge signal to the host 102. In an embodiment, the controller 130 may check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller 130 may determine which channel or way an instruction (and/or a data) is delivered through, based on a physical block address, e.g., which die(s) the instruction (and/or the data) is delivered into. The controller 130 may refer to descriptors delivered from the memory device 150. The descriptors may include parameters or information stored in a block or page, which can describe something about the memory device 150. The descriptors may be divided into plural pieces of data with a predetermined format or structure. For instance, the descriptors may include device descriptors, configuration descriptors, unit descriptors, and the like. The controller 130 may refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation (or the program operation), due to characteristics of a NAND logic function. During the bad block management, the data of the program-failed memory block or the bad memory block may be programmed into a new memory block. The bad blocks may seriously aggravate the utilization efficiency of the memory device 150 having a three-dimensional (3D) stack structure and the reliability of the memory system 110. Thus, reliable bad block management may enhance or improve performance of the memory system 110.

Figure 3:
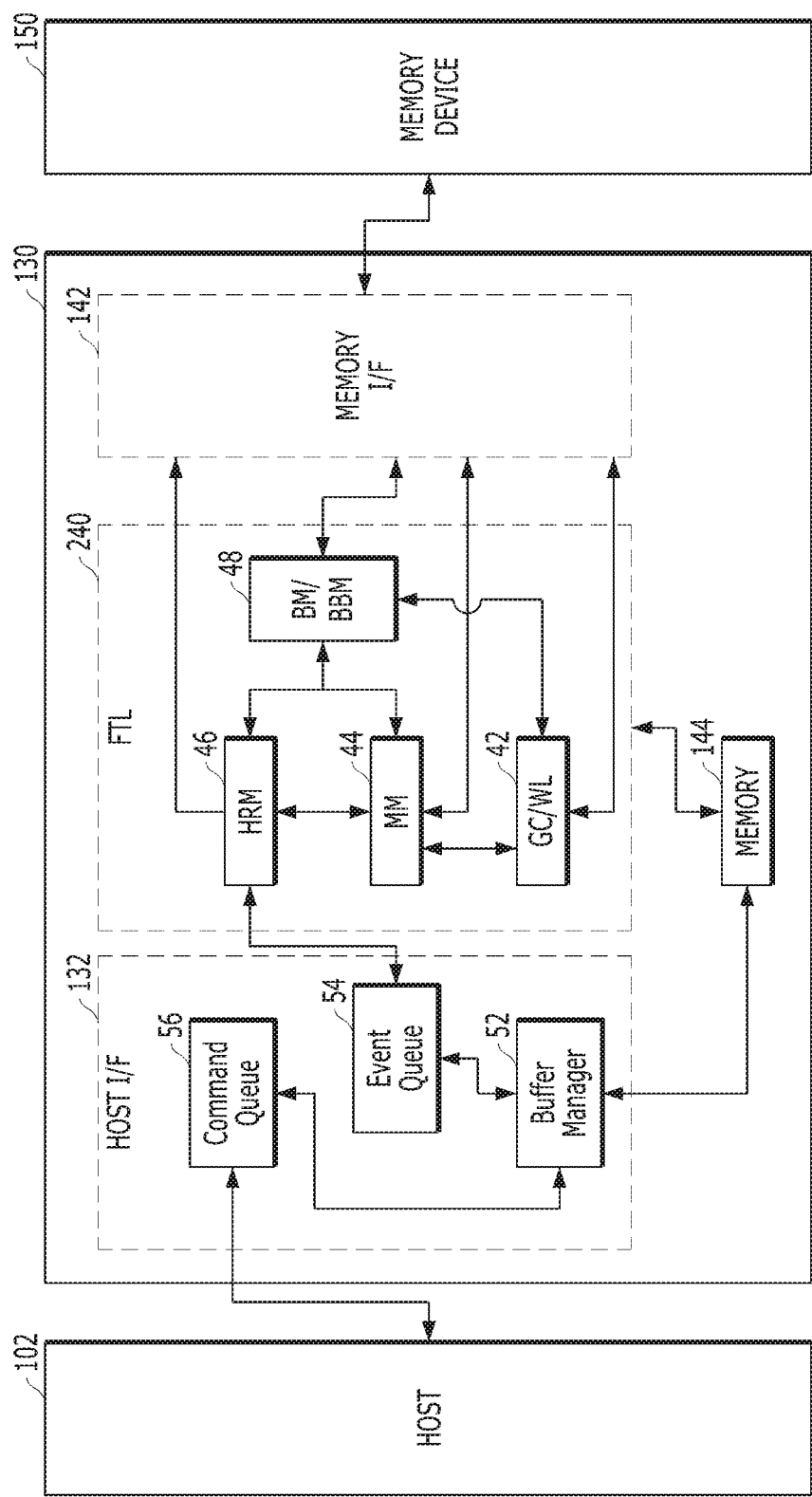
FIG. 3 illustrates a memory system in accordance with an embodiment of the disclosure.

FIG. 3 shows a controller 130 of a memory system in accordance with an embodiment of the disclosure.

Referring to FIG. 3, the controller 130 in a memory system in accordance with another embodiment of the disclosure is described in detail. The controller 130 cooperates with the host 102 and the memory device 150. The controller 130 includes a host interface (I/F) 132, a memory interface (I/F) 142, a memory 144 and a flash translation layer (FTL) 240.

Although not shown in FIG. 3, the ECC component 138 of FIG. 2 may be included in the FTL 240. In another embodiment, the ECC component 138 may be implemented as a separate module, a circuit, a firmware or the like, which is included in, or associated with, the controller 130.

The host interface 132 may handle commands, data, and the like received from the host 102. By way of example but not limitation, the host interface 132 may include a buffer manager 52, an event queue 54 and a command queue 56. The command queue 56 may sequentially store commands, data, and the like received from the host 102 and output them to the buffer manager 52 in a stored order. The buffer manager 52 may classify, manage or adjust the commands, the data, and the like, which are delivered from the command queue 56. The event queue 54 may sequentially transmit events for processing the commands, the data, and the like received from the buffer manager 52.

A plurality of commands and/or data of the same characteristic may be continuously received from the host 102. Alternatively, a plurality of commands and/or data of different characteristics may be received from the host 102, after being mixed or jumbled. For example, the host 102 may transmit a plurality of commands for reading data (i.e., read commands). For another example, the host 102 may alternatively transmit commands for reading data (i.e., read command) and programming/writing data (i.e., write command). The host interface 132 may store commands, data, and the like, which are received from the host 102, to the command queue 56 sequentially. Thereafter, the host interface 132 may estimate or predict what kind of operation the controller 130 will perform according to the characteristics of the command, data, and other relevant information which is received from the host 102. The host interface 132 may determine a processing order and a priority of commands and data, based at least on their characteristics. According to characteristics of commands and data, the buffer manager 52 of the host interface 132 is configured to determine whether the buffer manager 52 should store commands and data in the memory 144, or whether the buffer manager 52 should deliver the commands and the data to the FTL 240. The event queue 54 receives events, entered from the buffer manager 52, which are to be internally executed and processed by the memory system 110 or the controller 130 in response to the commands and the data, so as to deliver the events to the FTL 240 in the order received.

In accordance with an embodiment, the FTL 240 of FIG. 3 may perform functions of the garbage collection control circuitry 198 and the map data control circuitry 196 described in FIG. 1.

In accordance with an embodiment, the FTL 140 may include a state manager 42, a map manager (MM) 44, a host request manager (FIRM) 46, and a block manager (BM or BBM) 48. The host request manager 46 may manage the events entered from the event queue 54. The map manager 44 may handle or control map data. The state manager 42 may perform garbage collection or wear leveling. The block manager 48 may execute commands or instructions on a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map manager 44, to determine a physical address corresponding to the logical address which is entered with the events. The host request manager 46 may send a read request with the physical address to the memory interface 142, to process the read request (or handle the events). On the other hand, the host request manager 46 may send a program request (or write request) to the block manager 48, to program entered data to a specific page of the unrecorded (no data) in the memory device 150. Then, the host request manager 46 may transmit a map update request corresponding to the program request to the map manager 44, to update an item relevant to the programmed data in information of mapping the logical-to-physical addresses to each other.

The block manager 48 may convert a program request delivered from the host request manager 46, the map manager 44, and/or the state manager 42 into a flash program request used for the memory device 150, to manage flash blocks in the memory device 150. In order to maximize or enhance program or write performance of the memory system 110 of FIG. 2, the block manager 48 may collect program requests and send flash program requests for multiple-plane and one-shot program operations to the memory interface 142. It can be plausible that the block manager 48 sends several flash program requests to the memory interface 142 to enhance or maximize parallel processing of the multi-channel and multi-directional flash controller (i.e., the memory interface 142).

The block manager 48 may be configured to manage blocks in the memory device 150 according to the number of valid pages. Further, the block manager 48 may select and erase blocks having no valid pages when a free block is needed, and select a block including the least valid page when it is determined that garbage collection is necessary. The state manager 42 may perform garbage collection to move the valid data to an empty block and erase the blocks containing the moved valid data so that the block manager 48 may have enough free blocks (i.e., empty blocks with no data). If the block manager 48 provides information regarding a block to be erased to the state manager 42, the state manager 42 could check all flash pages of the block to be erased to determine whether each page is valid. For example, to determine validity of each page, the state manager 42 may identify a logical address stored in an area (e.g., an out-of-band (OOB) area) of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries, updates, and the like, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing an inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) is not completed normally, the map manager 44 may not perform the mapping table update. It is because the map request is issued with old physical information if the state manger 42 requests a map update and a valid page copy is completed later. The map manager 44 may perform a map update operation to ensure accuracy only if the latest map table still points to the old physical address.

In accordance with an embodiment, the state manager 42 may include the garbage collection control circuitry 196 shown in FIG. 1.

The memory device 150 may include a plurality of memory blocks. The plurality of memory blocks may be classified into different types of memory blocks such as a single level cell (SLC) memory block, a multi level cell (MLC) memory block or the like, according to the number of bits that can be stored or represented in one memory cell of the block. The SLC memory block includes a plurality of pages implemented by memory cells, each storing one bit of data. The SLC memory block may have high data input and output (I/O) operation performance and high durability. The MLC memory block includes a plurality of pages implemented by memory cells, each storing multi-bit data (e.g., two bits or more). The MLC memory block may have larger storage capacity in the same space than the SLC memory block. The MLC memory block can be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory or a NOR flash memory. But, in another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
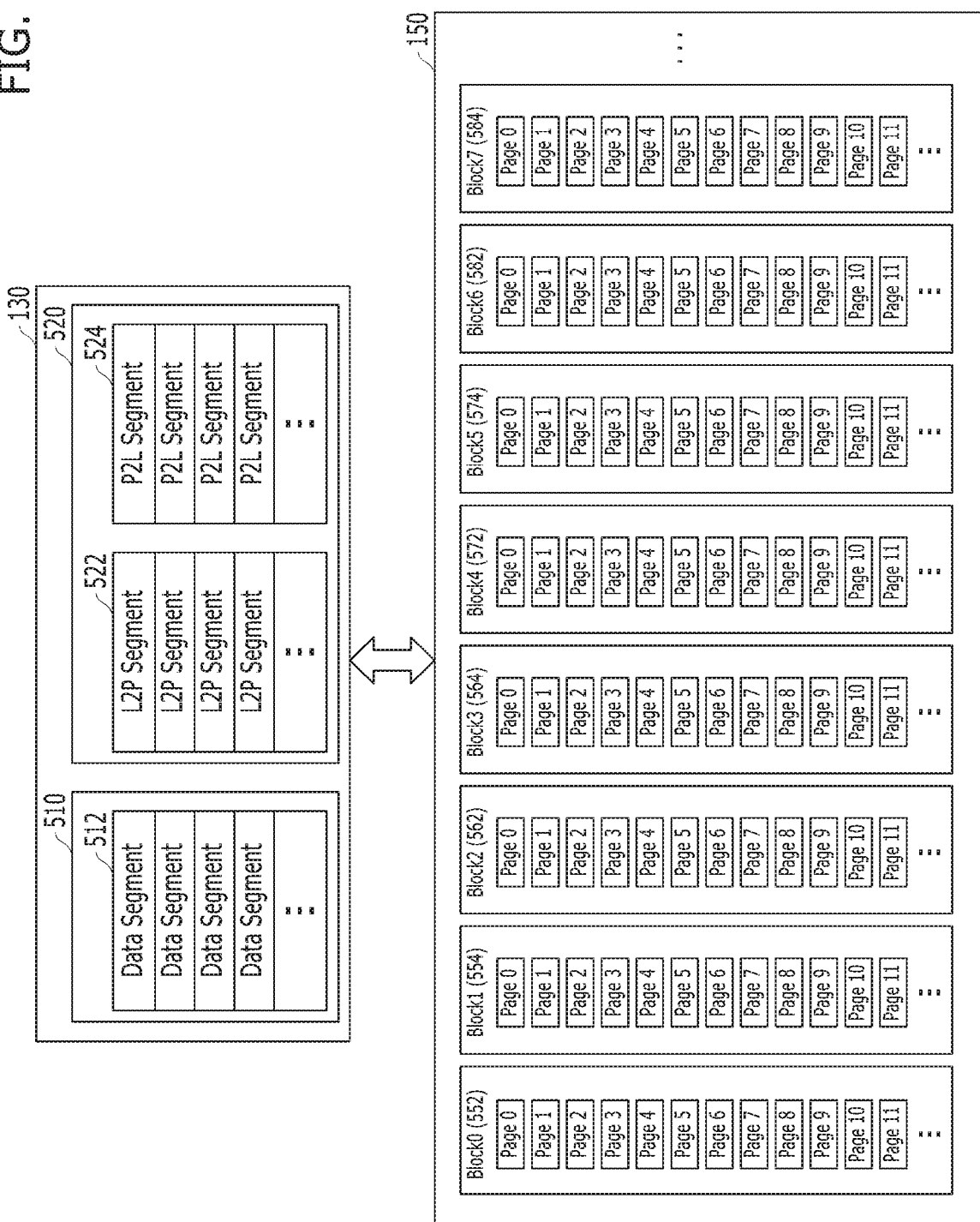
FIGS. 4 and 5 show a memory system which performs a plurality of command operations corresponding to a plurality of commands, in accordance with an embodiment of the disclosure.
Figure 5:
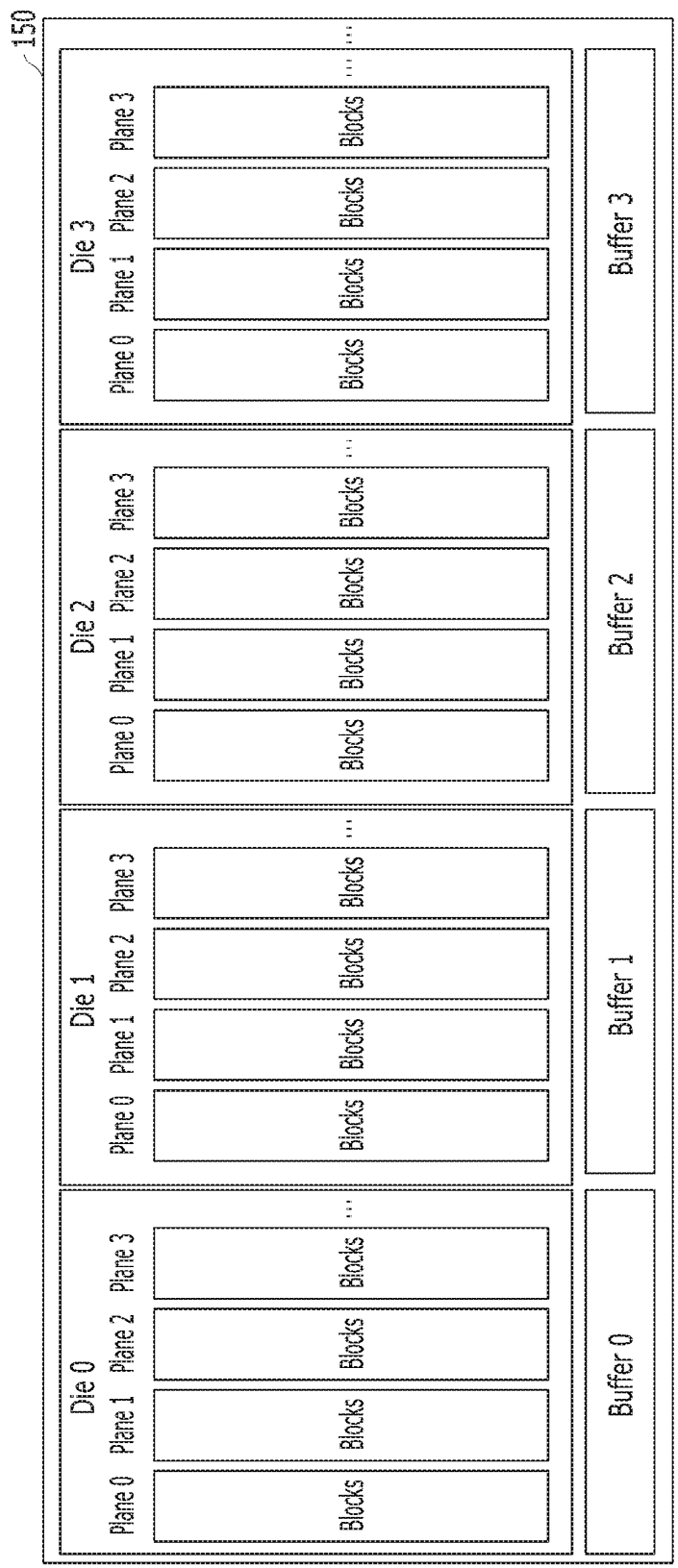

FIGS. 4 and 5 schematically illustrate performing a plurality of command operations corresponding to a plurality of commands in the memory system in accordance with an embodiment of the disclosure. A data processing operation may include a case where a plurality of write commands are received from the host 102 and program operations corresponding to the write commands are performed. Also, the data processing operation may include another case where a plurality of read commands are received from the host 102 and read operations corresponding to the read commands are performed. Further, the data processing operation may include another case where a plurality of erase commands are received from the host 102 and erase operations corresponding to the erase commands are performed. Furthermore, the data processing operation may include another case where a plurality of write commands and a plurality of read commands are received together from the host 102 and program operations and read operations corresponding to the write commands and the read commands are performed.

In an embodiment of the disclosure, write data corresponding to a plurality of write commands entered from the host 102 are stored in the buffer/cache in the memory 144 of the controller 130, and the write data stored in the buffer/cache are programmed to and stored in the plurality of memory blocks in the memory device 150. Further, map data are updated corresponding to the stored write data in the plurality of memory blocks, and the updated map data are stored in the plurality of memory blocks. In an embodiment of the disclosure, program operations corresponding to a plurality of write commands entered from the host 102 are performed. In an embodiment of the disclosure, a plurality of read commands are entered from the host 102 for the data stored in the memory device 150, and data corresponding to the read commands are read from the memory device 150 by checking the map data of the data corresponding to the read commands. Further, the read data are stored in the buffer/cache in the memory 144 of the controller 130, and the data stored in the buffer/cache are provided to the host 102. In other words, according to an embodiment of the disclosure, a case is described where read operations corresponding to a plurality of read commands entered from the host 102 are performed. In addition, according to an embodiment of the disclosure, a case is described where: a plurality of erase commands are received from the host 102 for the memory blocks in the memory device 150, memory blocks are checked corresponding to the erase commands, the data stored in the checked memory blocks are erased, map data are updated corresponding to the erased data, and the updated map data are stored in the plurality of memory blocks included in the memory device 150. More generally, a case is described where erase operations corresponding to a plurality of erase commands received from the host 102 are performed.

While the description below is given in the context that the controller 130 performs command operations in the memory system 110, it is to be noted that the processor 134 of the controller 130 in FIG. 2 may perform command operations in the memory system 110, through an FTL. In an embodiment of the disclosure, the controller 130 programs and stores user data and metadata, corresponding to write commands entered from the host 102, in memory blocks among the plurality of memory blocks in the memory device 150. Further, the controller 130 reads user data and metadata corresponding to read commands received from the host 102, from memory blocks among the plurality of memory blocks, and provides the read data to the host 102. Furthermore, the controller 130 erases user data and metadata, corresponding to erase commands entered from the host 102, from memory blocks among the plurality of memory blocks.

Metadata may include first map data including logical/physical (logical to physical (L2P)) information (i.e., logical information) and second map data including physical/logical (physical to logical (P2L)) information (i.e., physical information), for data stored in memory blocks corresponding to a program operation. The metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all remaining information and data excluding user data corresponding to a command received from the host 102.

In an embodiment of the disclosure, in the case where the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. First map data may include an L2P map table or an L2P map list in which logical information as the mapping information between logical addresses and physical addresses for the user data stored in the memory blocks are stored. Second map data may include a P2L map table or a P2L map list in which physical information as the mapping information between physical addresses and logical addresses for the memory blocks stored with the user data are stored. The first and second map data are written and stored in empty memory blocks, open memory blocks or free memory blocks among the memory blocks of the memory device 150.

In the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, corresponding to the data segments of the user data which are stored in the memory blocks of the memory device 150, the controller 130 generates and updates the L2P segments of first map data, and the P2L segments of second map data as the map segments of map data among the meta segments of metadata. The controller 130 stores the map segments in the memory blocks of the memory device 150. The map segments stored in the memory blocks are loaded in the memory 144 of the controller 130 and are then updated.

In the case where a plurality of read commands are received from the host 102, the controller 130 reads read data corresponding to the read commands, from the memory device 150, and stores the read data in the buffers/caches of the memory 144. The controller 130 provides the data stored in the buffers/caches, to the host 102, by which read operations corresponding to the plurality of read commands are performed.

In the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache of the memory 144, and then stores the data, that is, the metadata and the user data, in the memory device 150. Herein, by way of example but not limitation, the background operation may include a garbage collection operation or a read reclaim operation as a copy operation, a wear leveling operation as a swap operation or a map flush operation, For the background operation, the controller 130 may check metadata and user data corresponding to the background operation, in the memory blocks of the memory device 150. Further, the controller 130 may load and store the metadata and user data stored in certain memory blocks of the memory device 150, in the buffer/cache of the memory 144, and then store the metadata and user data, in certain other memory blocks of the memory device 150.

In the case of performing command operations as foreground operations, and a copy operation, a swap operation and a map flush operation as background operations, the controller 130 schedules queues corresponding to the foreground operations and the background operations. Further, the controller 130 allocates the scheduled queues to the memory 144 in the controller 130 and the memory in the host 102. In this regard, the controller 130 assigns identifiers (IDs) by respective operations for the foreground operations and the background operations to be performed in the memory device 150, and schedules queues corresponding to the operations assigned with the identifiers, respectively. Identifiers are assigned not only by respective operations for the memory device 150 but also by functions for the memory device 150, and queues corresponding to the functions assigned with respective identifiers are scheduled.

In an embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. After memory regions corresponding to the queues scheduled by identifiers are allocated to the memory 144 in the controller 130 and the memory in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands entered from the host 102. For example, the controller 130 performs program operations corresponding to a plurality of write commands entered from the host 102. The controller 130 programs and stores user data corresponding to the write commands, in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages of the memory blocks of the memory device 150. That is, the controller 130 generates and updates L2P segments as the logical segments of the first map data and P2L segments as the physical segments of the second map data. Then, the controller 130 stores the logical and physical segments in pages of the memory blocks of the memory device 150.

For example, the controller 130 caches and buffers the user data corresponding to the write commands entered from the host 102, in a first buffer 510 of the memory 144 of the controller 130. Particularly, after storing data segments 512 of the user data in the first buffer 510 worked as a data buffer/cache, the controller 130 stores the data segments 512 of the first buffer 510 in pages of the memory blocks of the memory device 150. As the data segments 512 of the user data corresponding to the write commands received from the host 102 are programmed to and stored in the pages of the memory blocks of the memory device 150, the controller 130 generates and updates the first map data and the second map data. The controller 130 stores the first and second map data in a second buffer 520 of the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages of the memory blocks of the memory device 150.

The controller 130 performs command operations corresponding to a plurality of commands received from the host 102. For example, the controller 130 performs read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

The controller 130 performs command operations corresponding to a plurality of commands entered from the host 102. For example, the controller 130 performs erase operations corresponding to a plurality of erase commands entered from the host 102. In particular, the controller 130 checks memory blocks corresponding to the erase commands among the memory blocks of the memory device 150 to carry out the erase operations for the checked memory blocks.

The controller 130 may perform an operation of copying data or swapping data among the memory blocks in the memory device 150, for example, a garbage collection operation, a read reclaim operation or a wear leveling operation, as a background operation. In the case of performing the garbage collection operation, the read reclaim operation or the wear leveling operation, the controller 130 stores data segments 512 of corresponding user data, in the first buffer 510, loads map segments 522, 524 of map data corresponding to the user data, in the second buffer 520, and then performs the garbage collection operation, the read reclaim operation or the wear leveling operation. The controller 130 may perform a map update operation and a map flush operation for metadata, e.g., map data, for the memory blocks of the memory device 150 as a background operation. In the case of performing the map update operation and the map flush operation, the controller 130 loads the corresponding map segments 522, 524 in the second buffer 520, and then performs the map update operation and the map flush operation.

As aforementioned, in the case of performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers. The controller 130 allocates memory regions corresponding to the respective queues, to the memory 144 in the controller 130 and the memory in the host 102. The controller 130 manages the identifiers assigned to the respective functions and operations, the queues scheduled for the respective identifiers and the memory regions allocated to the memory 144 of the controller 130 and the memory of the host 102 corresponding to the queues. The controller 130 performs the functions and operations for the memory device 150, through the memory regions allocated to the memory 144 of the controller 130 and the memory of the host 102.

Referring to FIG. 5, the memory device 150 includes a plurality of memory dies, for example, a memory die 0, a memory die 1, a memory die 2 and a memory die 3. Each of the memory dies includes a plurality of planes, for example, a plane 0, a plane 1, a plane 2 and a plane 3. The respective planes in the memory dies include a plurality of memory blocks, for example, N blocks Block0 to BlockN−1, each including a plurality of pages, for example, $2^M$ number of pages. The memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages of the memory dies. In the case of performing read operations, data corresponding to the read operations are read from the pages in the memory blocks of the memory dies, are stored in the buffers, and are then provided to the host 102 through the controller 130.

Although it is described below that the buffers in the memory device 150 are disposed outside the respective corresponding memory dies, it is noted that the buffers may be disposed within the respective corresponding memory dies. Further, it is noted that the buffers may correspond to the respective planes or the respective memory blocks in the respective memory dies. While it is described below that the buffers in the memory device 150 are page buffers, it is noted that the buffers may be a plurality of caches or a plurality of registers in the memory device 150.

The plurality of memory blocks in the memory device 150 may be grouped into a plurality of super memory blocks, and command operations may be performed in the plurality of super memory blocks. Each of the super memory blocks may include a group of memory blocks. For example, memory blocks in a first memory block group may form a first super block and memory blocks in a second memory block group may form a second super block. In this regard, when the first memory block group is included in the first plane of a certain first memory die, the second memory block group may be included in the first or second plane of the first memory die, or in the planes of a second memory die.

In an embodiment of the disclosure, a data processing system may include plural memory systems. Each of the plural memory systems 110 may include the controller 130 and the memory device 150. In the data processing system, one of the plural memory systems 110 may be a master and the others may be a slave. The master may be determined based on contention (e.g., competition for resources) between the plural memory systems 110. When a plurality of commands is received from the host 102 in the data processing system, the master may determine a destination of each command based at least on statuses of channels or buses. For example, a first memory system may be determined as a master memory system among a plurality of memory systems, corresponding to information (e.g., operational status) delivered from the plurality of memory systems. If the first memory system is determined as the master memory system, the remaining memory systems are considered slave memory systems. A controller of the master memory system may check statuses of a plurality of channels (or ways, buses) coupled to a plurality of memory systems, to select which memory system handles commands or data delivered from the host 102. In an embodiment, a master may be dynamically determined among the plural memory systems. In another embodiment, a master memory system may be changed with one of other slave memory systems periodically or according to an event.

A method and an apparatus for transferring data in the memory system 110 including the memory system 150 and the controller 130 described above will be described in more detail. As the amount of data stored in the memory system 110 becomes larger, the memory system 110 may be required to read or store large amounts of data at a time. However, a read time for reading data stored in the memory device 150 or a program/write time for writing data in the memory device 150 may be generally longer than a handling time for the controller 130 to process data or a data transmission time between the controller 130 and the memory system 150. For example, the read time might be twice that of the handling time. Since the read time or the program time is significantly longer than the handling time or the data transmission time, a procedure or a process for delivering data in the memory system 110 may affect performance of the memory system 110, e.g., operation speed, and/or structure of the memory system 110 such as a buffer size.

Figure 6:
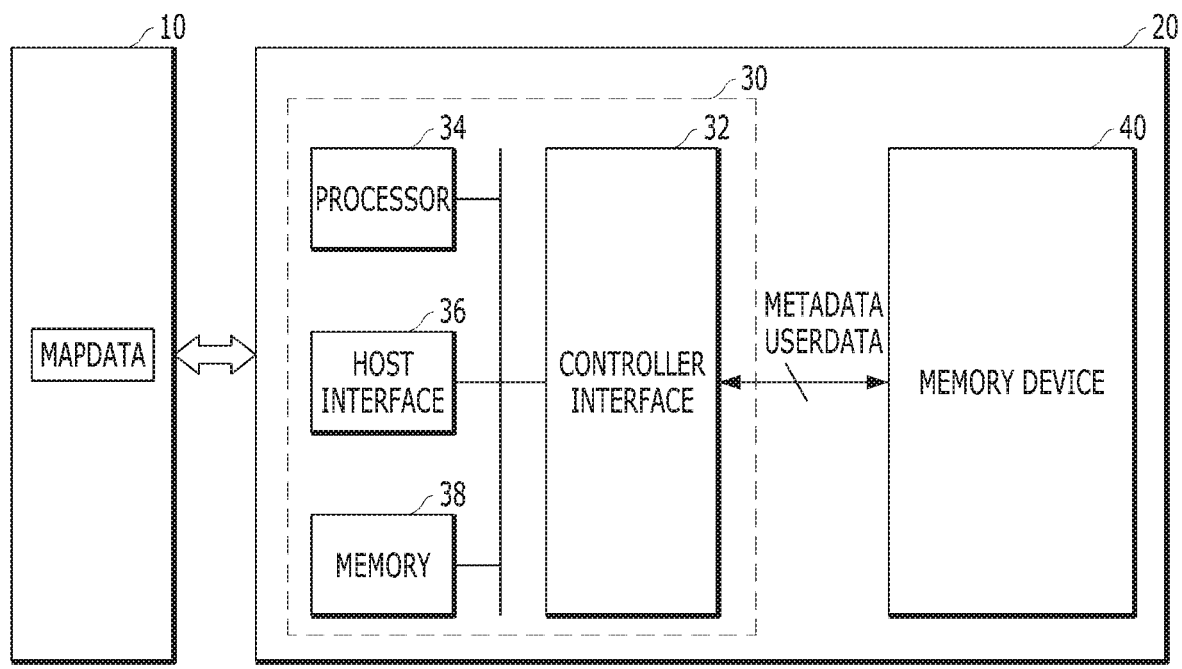
FIG. 6 illustrates a memory system including a controller and a non-volatile memory device in accordance with an embodiment of the disclosure.

FIG. 6 illustrates a host 10 and a memory system 20 according to an embodiment of the disclosure. The host 10, the memory system 20 and other components may be constituted with a data processing system according to an embodiment of the disclosure. In a computing device or a mobile device embedded with the memory system 20, the memory system 20 is engaged with the host 10 to exchange data.

Referring to FIG. 6, the memory system 20 may include a controller 30 and a memory device 40. The controller 30 receives and outputs data, requested from the host 10, from the memory device 40 or stores the data received from the host 10 into the memory device 40 in order to perform command operations received from the host 10. The memory device 40 includes a plurality of memory cells capable of storing data. The internal configuration of the memory device 40 may be changed in accordance with the characteristics of the memory device 40, the purposes for which the memory system 20 is used, the specifications of the memory system 20 required by the host 10, or the like. For example, the memory device 150 of FIGS. 1 to 5 and the memory device 40 of FIG. 6 may include the same components. In addition, the controller 130 of FIGS. 1 through 5 and the controller 30 of FIG. 6 may include the same components.

The controller 30 may include a processor 34, a host interface 36, a memory 38, and a controller interface 32. The processor 34 may play a role for processing command operations within the controller 30, similar to that of a CPU used in a computing device. The host interface 36 performs an operation for data communication between the memory system 20 and the host 10, while the controller interface 32 performs an operation for data communication between the memory device 40 and the controller 30. The memory 38 temporarily stores the data and operation status required during operations performed by the processor 34, the host interface 36 and the controller interface 32. Alternatively, the memory 38 may temporarily store I/O data between the memory device 40 and the host 10. The internal configuration of the above-described controller 30 may be a function classification according to an operation, a task, or the like which is handled or processed by the controller.

According to an embodiment, the physical configuration of the controller 30 may be composed of at least one processor, at least one memory, at least one input/output port, and a wiring for electrical connection between the above-mentioned components.

The controller 30 and the memory device 40 may exchange metadata and user data with each other. For example, the user data includes data to be stored by a user through the host 10, and the metadata includes system information (e.g., map data and the like) necessary for storing and managing the user data in the memory device 40. The user data and the meta data may be processed or managed in different ways in the controller 30 because the properties of the user data and the meta data are different from each other.

As a storage capacity of the memory device 40 increases, the size of status information increases. Such status information may include system information, map information, and/or operation information necessary for operations such as reading, programming, and erasing data within the dies, blocks, or pages in the memory device 40. It is difficult for the controller 30 to store all the status information in the memory 38. Thus, the system information, the map information, and the operation information for operations such as reading, programming, and erasing may be stored in the memory device 40, as well as user data. The controller 30 may load, from the plurality of dies or blocks in the memory device 40, some information necessary for operations such as reading, programming, or erasing data from pages in the memory device 40, and then re-store the updated information in the memory device 40 after the corresponding operation is completed.

Although not shown, as the number of memory cells capable of storing data in the memory device 40 increases, the internal structure of the memory device 40 may become more complicated as described in FIG. 6. The controller 30 may transmit or receive connection information according to the internal configuration of the memory device 40 together with the data. For example, in a case when a plurality of dies, each including multiple blocks, is included in the memory device 40 as shown in FIG. 6, there are n channels and m ways (where n or m is an integer greater than 1) between the controller 30 and the memory device 40. The data and the connection information may be transferred via the n channels and the m ways. However, in order for the controller 30 to read or write data to the memory device 40, additional control variables or control signals may be needed depending on the internal structure of the memory device 40. As more dies are included in the memory device 40, additional information required for performing operations becomes larger.

The host 10 and the memory system 20 may exchange commands, addresses, and data with each other, according to a protocol, a system communication method, or an interface. Thus, the host 10 may not need to be aware of the specific structure within the memory system 20. When the host 10 stores a specific data to the memory system 20 or attempts to read data stored in the memory system 20, the host 10 sends a logical block address (LBA). For example, the logical block address (LBA) is a logical block addressing method, and may be a format used to specify the location of a data block to be stored in a storage device associated with a computing device. For example, in the case of a conventional hard disk, an addressing method indicating a physical structure in a hard disk, such as a cylinder, a head, and a sector (Cylinder-Head-Sector, CHS) was used. However, the address system corresponding to the physical structure of the hard disk has reached the limit as the storage capacity of the hard disk increases. In such a large-capacity storage device, the address may be specified in a manner that the sectors are arranged in a logical sequence in a row, and the sectors are numbered (for example, in order from 0), regardless of the physical structure of the hard disk. Instead of the host 10 transferring or pointing data only to the logical block address (LBA), the controller 30 in the memory system 20 may store and manage the physical address, which is the address in the memory device 40 where the actual data is stored. It is necessary to match and manage the logical block address (LBA) used by the host 10. Such information may be included in metadata and may be distinguished from user data stored or read by the host 10.

As the amount of data to be stored in the memory device 40 increases, efficient management of metadata may be required. As the size of the plurality of blocks in the memory device 40 increases, the amount of data to be stored increases as well as the amount of metadata also increases. This increases the resources (e.g., time) required to maintain and manage the stored data in the memory device 40, so that an apparatus and method for increasing the operational efficiency, stability, or reliability of the memory system 20 may be required.

According to an embodiment, the memory system 20 may include a memory device 40 that includes a plurality of blocks capable of storing data. The memory system 20 may include the controller 30 configured to divide each block into a plurality of logical unit blocks. The controller 30 may compare a valid page count of the block with the number of map data of each logical unit block, check whether the map data is duplicated in a reverse order of programming data in the block, and delete or nullify old duplicated map data. A procedure for comparing, verifying and deleting by the controller 30 to adjust the map data may be performed in a specific block having a state in which data may no longer be written to that block without an erase operation (for example, closed state).

The controller 30 may compare the valid page count with the number of map data when plural program operations with different data corresponding to a same logical block address is repeatedly required by commands entered from the host 10. According to an embodiment, each of plural memory blocks in the memory device 40 may be stored sequentially from the first page to the last page therein. For example, a block is a unit in which an erase operation is performed. At least two logical unit blocks may be included in a block. The logical unit block may be a minimum unit to which map data is allocated or managed together. For example, the map data may include information (e.g., physical to logical (P2L)) used for associating a physical address, assigned in each block unit, with a logical address used by the host 102.

Figure 7:
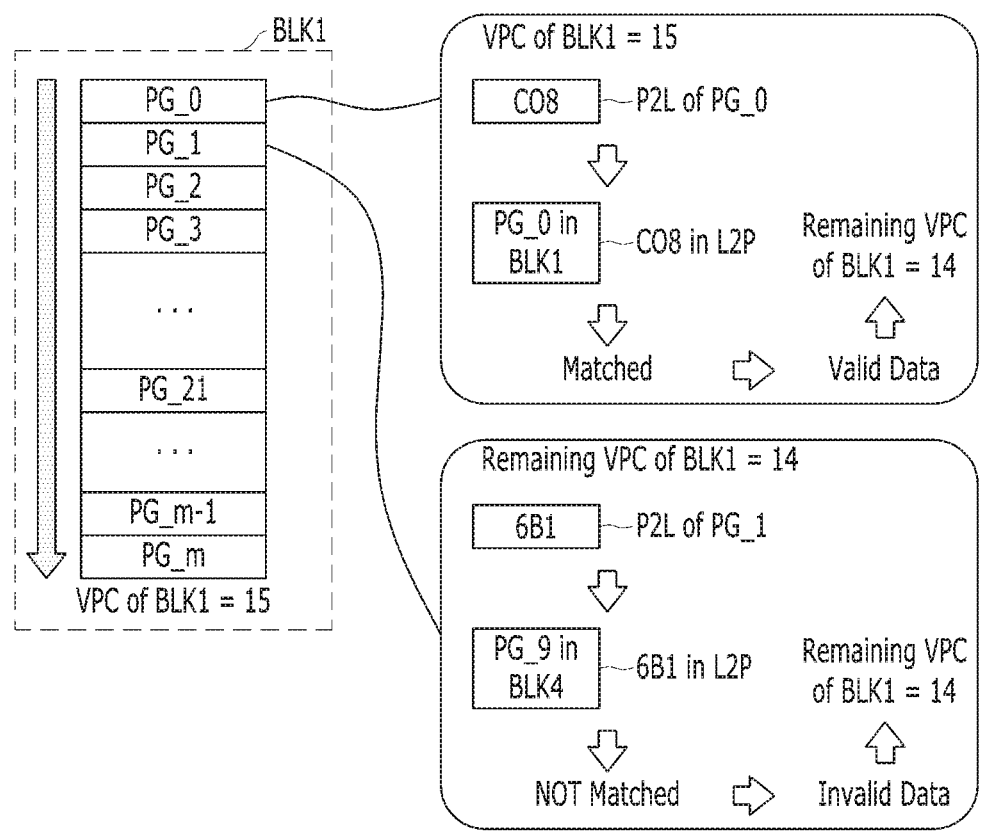
FIG. 7 illustrates an example of a method for searching for valid data in a controller in accordance with an embodiment of the disclosure.

FIG. 7 illustrates an example of an operation method of a controller for searching for valid data.

Referring to FIG. 7, a first block BLK1 in the memory device is selected as a victim block for garbage collection. For example, the first block BLK1 may include (m+1) pages (e.g., pages PG_0 to PG_m where 'm' is a natural number of 32 or more). It is assumed that the first block BLK1 is in a closed state and a valid page count (VPC) of the first block BLK1 is 15.

The controller may sequentially determine data validity from the first page PG_0 to the last page PG_m of the first block BLK1. In FIG. 7, validity of data stored in the first page PG_0 may be determined as follows.

When the controller 30 finds a logical address of data in the first page PG_0 of the first block BLK1 based on the second address information (e.g., P2L map table), there may be an address value of 'C08' (i.e., logical address). Thereafter, the controller 130 may search for information (i.e., physical address) corresponding to the address value of 'C08' in the first address information (e.g., L2P map table). In FIG. 7, the information corresponding to the address value of 'C08' in the first address information (e.g., L2P map table) may indicate the first page PG_0 of the first block BLK1. In this case, since address information for the data stored in the first page PG_0 of the first block BLK1 is matched between the second address information and the first address information, the controller 30 may determine that the data stored in the first page PG_0 of the first block BLK1 is a kind of valid data. Thereafter, the valid page count VPC of the first block BLK1 may be deducted by one, and the remaining valid page count Remaining VPC of the first block BLK1 may be 14 (=15−1).

Subsequently, the controller 30 may determine the validity of the data stored in the second page PG_1 of the first block BLK1. When the controller 30 checks a logical address corresponding to the data programmed in the second page PG_1 of the first block BLK1 in the second address information (e.g., P2L map table), there may be an address value of '6B1'. Thereafter, the controller 30 may search for information (i.e., physical address) corresponding to the address value of '6B1' in the first address information (e.g., L2P map table). In FIG. 7, the information corresponding to the address value of '6B1' in the first address information (e.g., L2P map table) may indicate a tenth page PG_9 of the fourth block BLK4. In this case, the data stored in the second page PG_1 of the first block BLK1 is no longer valid because there is no matched relation between the second address information and the first address information regarding the data stored in the second page PG_1 of the first block BLK1. Since the data programmed in the second page PG_1 is not valid, the remaining valid page count in the first block BLK1 is neither reduced nor changed. The number of remaining valid pages may be 14 (=14-0).

As described above, the controller 30 may sequentially determine validity of data stored in each page of the first block BLK_1 selected as a victim block for the garbage collection. According to an embodiment, validity of data may be sequentially checked until the remaining valid page count Remaining VPC of the first block BLK1 becomes zero.

Figure 8:
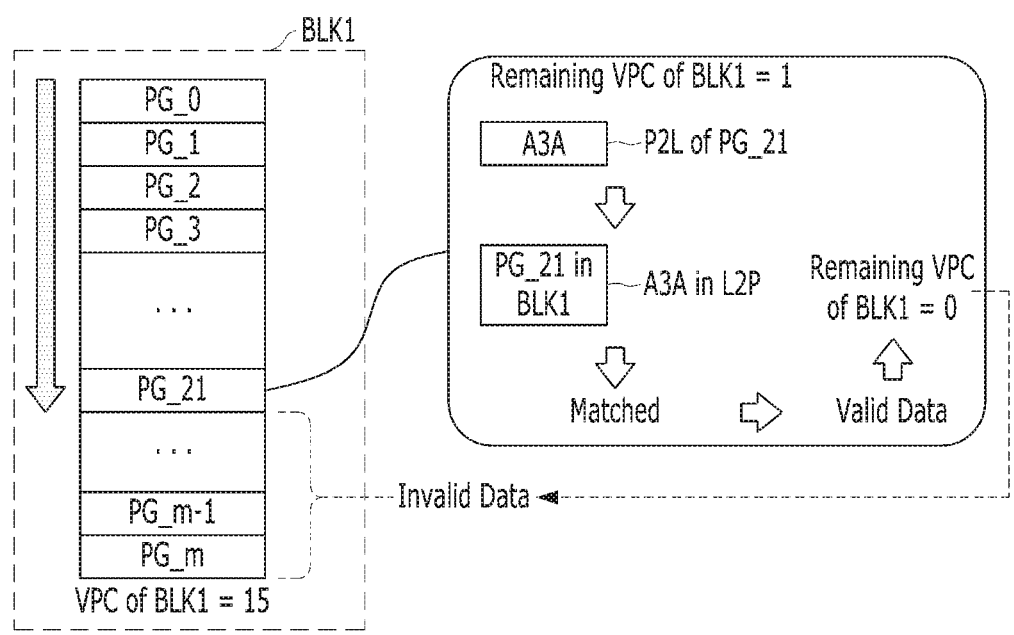
FIG. 8 illustrates a first example in which the controller stops searching for valid data.

FIG. 8 illustrates a first example in which the controller stops searching for valid data in a specific memory block.

Referring to FIG. 8, a process for checking data validity is sequentially performed from the first page PG_0 of the first block BLK1, which is the target block of the garbage collection. Moreover, the remaining valid page count Remaining VPC of the first block BLK1 is before validity of data stored in the 22nd page PG_21 of the first block BLK1 is checked.

The controller 30 may determine the validity of the data stored in the 22nd page PG_21 of the first block BLK1. When the controller 130 finds a logical address corresponding to data programmed in the 22nd page PG_21 of the first block BLK1 in the second address information (e.g., P2L map table), there may be an address value of 'A3A'. Then, the controller 30 searches for a physical address corresponding to the logical address of 'A3A' in the first address information (e.g., L2P map table). In FIG. 8, the physical address corresponding to the logical address of 'A3A' in the first address information (e.g., L2P map table) may indicate the 22nd page PG_21 of the first block BLK1. In this case, because the second address information and the first address information regarding the data stored in the 22nd page PG_21 of the first block BLK1 are matched with each other, it is determined that the data programmed in the 22nd page PG_21 of the first block BLK1 is a sort of valid data. Thereafter, the remaining valid page count Remaining VPC of the first block BLK1 may be subtracted by one, and the number of remaining effective pages may be 0 (=1-1).

If the remaining valid page count Remaining VPC of the first block BLK1 is 0, the controller 30 may determine that no valid data exists from the 23rd page PG_22 to the last page PG_m of the first block BLK1. The controller 30 may stop an operation of searching for valid data in the first block BLK1 and move only the data determined to be valid in the first block BLK1 to another block.

In a first part of the first block BLK1, i.e., from the first page PG_0 to the 22nd page PG_21 of the first block BLK1, the controller 30 performs an operation for checking data validity for each page, but may not perform the operation in a second part of the first block BLK1, i.e., from the 23rd page PG_22 to the last page PG_m of the first block BLK1. For example, when the first block BLK1 includes 128 pages or 256 pages, the controller 30 does not need to determine the data validity for each page in many parts of the first block BLK1, so that it is possible to greatly reduce the resources required to search for valid data during garbage collection.

Figure 9:
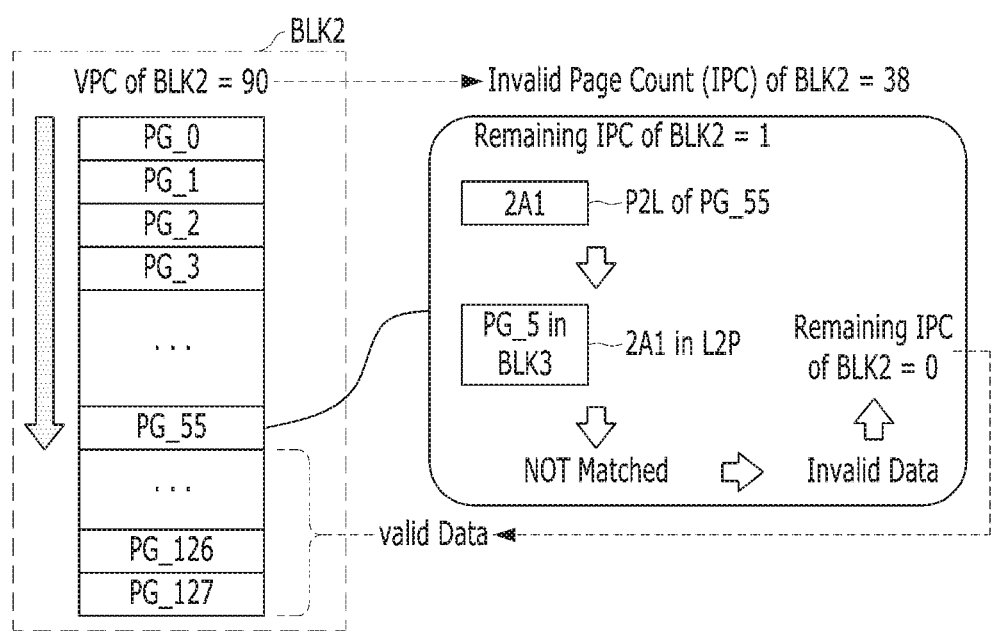
FIG. 9 illustrates a second example in which the controller stops searching for valid data.

FIG. 9 illustrates a second example in which the controller aborts an operation of searching for valid data in a memory block.

Referring to FIG. 9, a second block BLK2 is selected as a victim block for garbage collection. Further, a valid page count VPC of the second block BLK2 is 90 and a data validity check process may be sequentially performed from the first page PG_0 to the last page PG_127 of the second block BLK2.

Unlike the embodiments using the valid page count VPC shown in FIGS. 7 and 8 to determine the validity of the data programmed in the first block BLK1, an invalid page count (IPC) may be used in the embodiment shown in FIG. 9. In FIG. 9, the total number of pages in the second block BLK2 is 128. Since the valid page count VPC of the second block BLK2 is 90, the second block BLK2 may have more valid data (i.e., 90 pieces) than invalid data (i.e., 38 pieces (=128-90)). Accordingly, the controller 30 may determine invalidity of data programmed from the first page PG_0 to the last page PG_127 of the second block BLK2. In FIG. 9, the invalid page count IPC of the second block BLK2 may be 38.

The controller 30 may sequentially retrieve invalid data from the first page PG_0 of the second block BLK2, and then subtract the invalid page count IPC of the second block BLK2 whenever searching for the invalid data. In FIG. 9, the remaining invalid page count Remaining IPC at the 56th page PG_55 of the second block BLK2 is one.

The controller 30 may determine validity of data programmed in the 56th page PG_55 of the second block BLK2. When the controller 30 finds a logical address corresponding to the data programmed in the 56th page PG_55 of the second block BLK2 in the second address information (e.g., P2L map table), there may be an address value of '2A1'. Then, the controller 30 searches for a physical address corresponding to the logical address of '2A1' in the first address information (e.g., L2P map table). In FIG. 9, the physical address corresponding to the address value of '2A1' in the first address information (e.g., L2P map table) may indicate the sixth page PG_5 of the third block BLK3. In this case, since the second address information and the first address information regarding the data in the 56th page PG_55 of the second block BLK2 are not matched with each other, the data in the 56th page PG_55 of the second block BLK2 is considered as invalid data. Thereafter, the remaining invalid page count Remaining IPC of the second block BLK2 may be subtracted by one, and the remaining invalid page count Remaining IPC of the second block BLK2 becomes 0 (=1−1).

If the remaining invalid page count Remaining IPC of the second block BLK2 is 0, the controller 30 presumes that all pieces of data programmed from the 57th page located after the 56th page PG_55 to the last page PG_127 are valid without checking validity of each data. Then, the controller 30 may stop the operation of searching for valid or invalid data in the remaining part of the second block BLK2 and move only the data determined to be valid in the second block BLK2 to another block.

According to an embodiment, the controller 30 may search for valid data or invalid data in a victim block for garbage collection. For example, when the valid page count VPC for the victim block is greater than half the total number of pages of that block, the controller 30 may check the validity of the data using the invalid page count IPC. When the valid page count VPC for the victim block is less than ½ of the total number of pages of the victim block, the controller 130 may check the validity of the data using the valid page count VPC.

Figure 10:
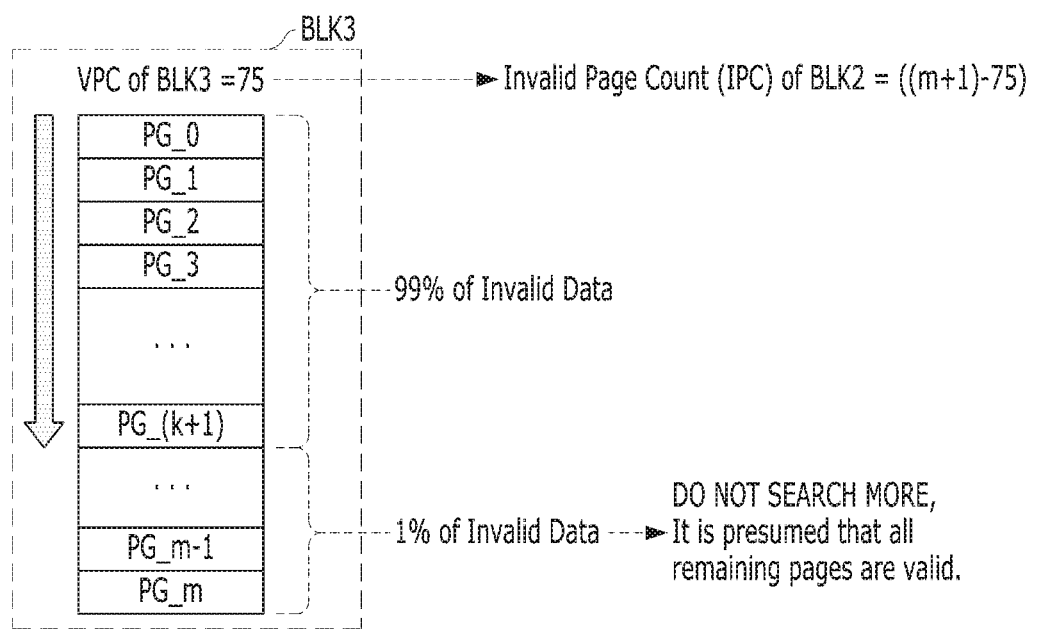
FIG. 10 illustrates a third example in which the controller searching for valid data.

FIG. 10 illustrates a third example in which the controller halts an operation of searching for valid data in a specific memory.

Referring to FIG. 10, a third block BLK3 in the memory device is selected as a victim block for garbage collection. The third block BLK3 may include (m+1) pages. For example, m may be a natural number of 80 or more.

If a valid page count VPC of the third block BLK3 is 75, an invalid page count IPC of the third block BLK3 may be ((m+1)−75). As the embodiment described with reference to FIG. 9, the controller 30 may sequentially check validity of data from the first page PG_0 of the third block BLK3. Particularly, the controller 30 may use the invalid page count IPC of the third block BLK3 for garbage collection. The controller 30 may subtract the invalid page count IPC of the third block BLK3 by one whenever a piece of invalid data is searched.

In FIG. 10, 99% of invalid data in the third block BLK3 has been checked by a process for checking data validity from the first page PG_0 to a specific page PG_k. The controller 30 may presume that data in all remaining pages from any page PG_(k+1) to the last page PG_0 are valid, rather than further checking 1% of invalid data from all remaining pages. The controller 30 may not check data validity from any page PG_(k+1) to the last page PG_m.

After determining validity of the data stored in the specific page PG_k, the controller 30 may recognize the number of remaining pages, e.g., ((m+1)−k) pages, to perform check the validity of data in the third block BLK3, and know how many pieces of invalid data have been searched from the first page PG_0 to the specific page PG_k.

After determining data validity from the first page PG_0 to the arbitrary page PG_k, the controller 30 may not halt an operation for checking data validity based on whether the ((m+1)−75) invalid page count IPC of the third block BLK3 becomes zero. But, the controller 130 may presume that all pieces of data stored in the remaining pages, e.g., ((m+1)−k) pages, are valid when less than or equal to 1% of invalid data in the third block BLK3 is not found yet. In this case, 1% or less than 1% of invalid data in the garbage collection performed for the third block BLK3 may move to another block along with valid data.

In the above-described manner, even if 1% or less than 1% of the invalid data in the garbage collection moves to another block together with the valid data, adverse effect on the performance of the garbage collection may be insignificant. On the other hand, resources that may be consumed to extract 1% or less than 1% of invalid data in the third block BLK3 may be very large. Thus, to enhance or increase the operation efficiency of the garbage collection, it is possible to move an insignificant amount of invalid data along with the valid data. Even though the invalid data is moved to another memory block, the invalid data is not changed into valid data because the second address information and the first address information for the invalid data are still not matched with each other. Therefore, the migration of the invalid data may not cause a concern in the operation of the memory system.

Figure 11:
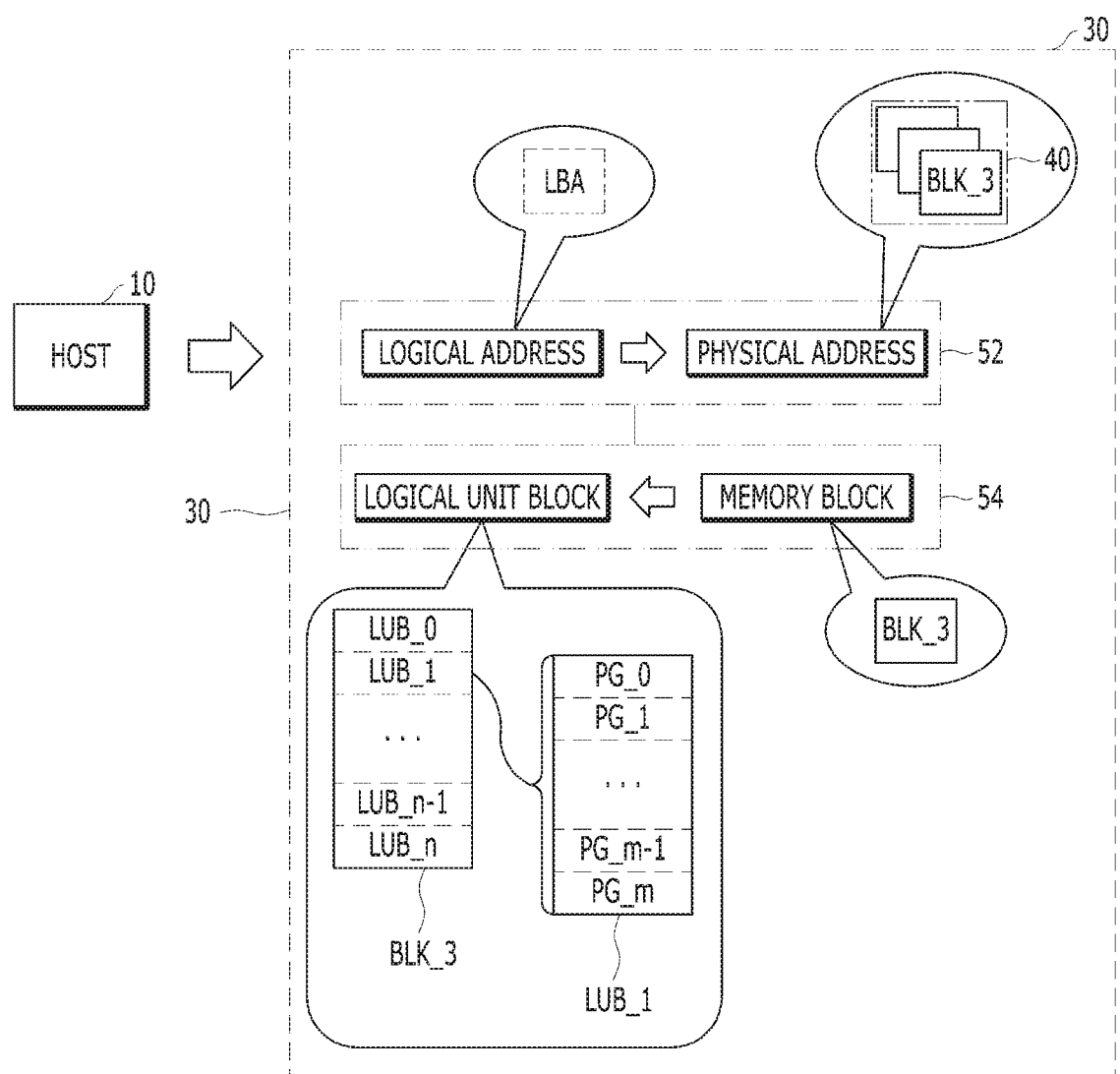
FIG. 11 illustrates a method for controlling metadata in a controller in accordance with an embodiment of the disclosure.

FIG. 11 shows a method for controlling metadata, which may be performed by a controller of the memory system. In FIG. 11, the host 10 may transfer a command to the memory system 20 of FIG. 6 to repeatedly program data associated with the same logical block address (LBA). A memory device 40 of the memory system 20 may include a non-volatile memory device (e.g., flash memory). If the memory system 20 may write or program data to a specified physical location and then overwrite other data, the memory system 20 may repeatedly overwrite different data entered from the host 10 with the same logical block address (LBA) at the same location of the memory device 40. However, in the memory device 40 such as the non-volatile memory device (e.g., flash memory), it is not possible to overwrite data at the same location and therefore the data must be programmed at a new location (i.e., different location).

Referring to FIG. 11, the controller 30 may receive data, a logical block address, and a program command received from the host 10. The controller 30 may translate the logical block address into a physical block address in response to the program command (52). For example, the logical block address may be a logical address or a logical block address (LBA) which the host 10 recognizes and uses. For example, the logical address is an indicator for identifying one of sectors, spaces or areas sequentially arranged in a whole user data storage. For example, a specific logical block address (LBA) may be translated into a physical block address BLK_3 in the memory device 40. By way of example but not limitation, such address translation may be achieved by firmware that implements the FTL described above.

As the memory system stores a larger amount of user data, each block (e.g., BLK_3) has a larger size. Accordingly, a memory block (e.g., BLK_3) in the memory device 40 may be divided into a plurality of logical unit blocks LUB_0 to LUB_n (54). Some operations may be controlled or managed on a basis of a logical unit block, that is, logical unit block by logical unit block. For example, the block BLK_3 may include "n" number of logical unit blocks LUB_0 to LUB_n. For example, 'n' is a natural number of 2 or more. Each logical unit block (e.g., LUB_1) may include 'm' number of pages PG_0 to PG_m, where m is a natural number of 2 or more.

According to an embodiment, individual map data may be assigned or allocated to each logical unit block. In an embodiment, a physical to logical (P2L) mapping table for mapping a physical address corresponding to each logical unit block with a logical address may be generated to determine whether data stored in each of plural pages of a logical unit block is valid.

Figure 12:
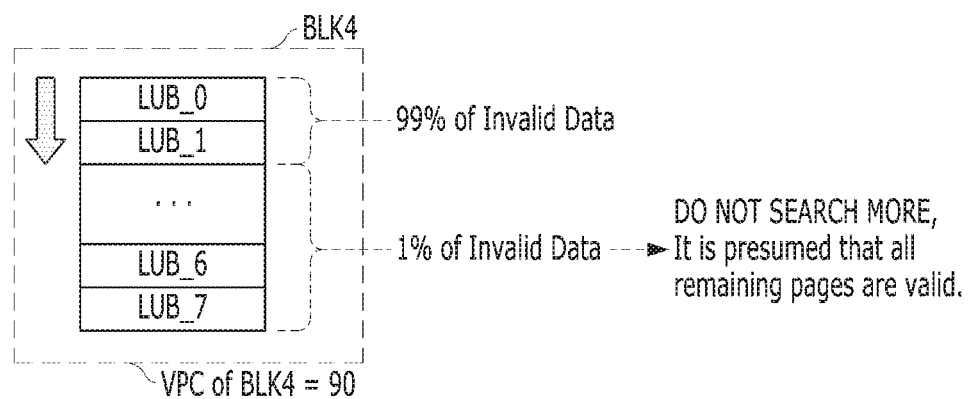
FIG. 12 illustrates a fourth example in which the controller stops searching for valid data.

FIG. 12 illustrates a fourth example in which the controller stops searching for valid data in a specific block.

Referring to FIG. 12, a fourth block BLK4 may be selected as a victim block for garbage collection. The fourth block BLK4 has a valid page count VPC of 90 may be divided into a plurality of logical unit blocks LUB_0 to LUB_7 as described with reference to FIG. 11.

Map data may be generated and controlled on a basis of each logical unit block. The controller 30 may perform valid data search on a basis of a logical unit block for garbage collection. It is assumed that 99% of invalid data in the fourth block BLK4 is searched in the first logical block LUB_0 and the second logical block LUB_1. In this case, as in the embodiment of FIG. 10, the controller 30 may halt a process of searching for invalid data in the remaining six logical blocks LUB_2 to LUB_7, rather than keep searching for 1% of the invalid data in the remaining six logical blocks. As compared with a process for searching for an insignificant amount of invalid data in the remaining six logical blocks, halting or skipping the process in the remaining six logical blocks may be more efficient to reduce resources consumed for garbage collection.

Figure 13:
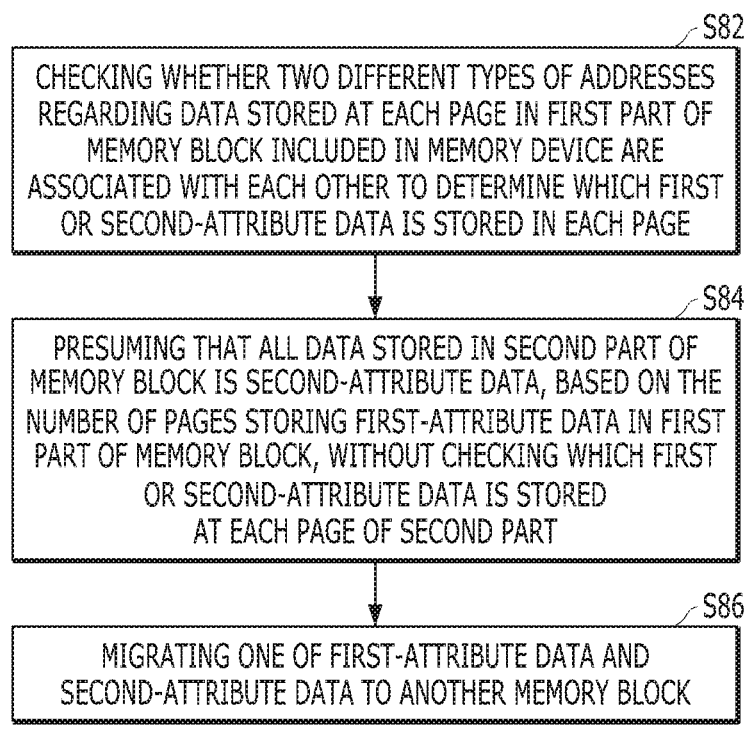
FIG. 13 illustrates a method for operating a memory system in accordance with another embodiment of the disclosure.

FIG. 13 illustrates a method for operating a memory system in accordance with another embodiment of the disclosure.

Referring to FIG. 13, an operation method of a memory system may include steps S82, S84 and S86. The step S82 may include checking whether two different types of addresses regarding each data stored at a page in a first part of a memory block included in a memory device are associated with each other to determine which first or second-attribute data is stored in each page. The step S84 may include presuming that all data stored in a second part of the memory block is the second-attribute data, based on a first-attribute page count of the memory block and the number of pages storing the first-attribute data in the first part of the memory block, without checking which first or second-attribute data is stored at each page of the second part. The step S86 may include migrating one of the first-attribute data and the second-attribute data to another memory block.

In an embodiment, a process for determining validity of data stored for each page from the first page to the last page of a specific memory block selected as a victim block for the garbage collection (GC) is performed, and resources consumed in searching for valid data could be reduced to increase operational efficiency of the memory system. Particularly, during the garbage collection according to an embodiment, it is presumed whether the data is valid or invalid without checking data validity with respect to a second part of the memory block through the number of first attribute data or second attribute data in a first part of the memory block and operation information regarding the memory block selected as the victim block. Then, presumed data could be migrated into another memory block.

According to an embodiment, the first attribute may indicate that a piece of data is valid, i.e., the piece of data is the latest corresponding to a specific logical address, while the second attribute may indicate that the piece of data is invalid, i.e., the piece of data is not the latest corresponding to the specific logical address so that the piece of data is not used any longer. In this case, the number of first attribute data may be substantially equal to a valid page count (VPC) of the memory block.

In another embodiment, the first attribute indicates that a piece of data is invalid, while the second attribute indicates that the piece of data is valid. In this case, the number of first attribute data may be substantially equal to an invalid page count (IPC) of the memory block described in FIG. 10.

In the method of operating the memory system, validity of data programmed from the first page to the last page of the selected block may be checked sequentially. When a process for data validity at a single page is completed, the valid page count (VPC) or the invalid page count (IPC) may be deducted according to a result of the process. For example, it is assumed that the valid page count (VPC) of the victim block is 50. When data stored in the first page is valid, the remaining valid page count Remaining VPC is 49. A process for checking validity of data stored in the second page may be performed and then the remaining valid pages Remaining VPC may be adjusted according to a result.

The memory block selected as the victim block may be divided into a first part and a second part. For example, the first part includes a region in which a process for judging data validity is performed on a page-by-page basis, and the second part includes a region in which the process for judging data validity is not performed on a page-by-page basis. But, it is presumed that pieces of data stored in the second part may be a kind of valid or invalid data.

According to an embodiment, data validity may be checked sequentially from the first page to the last page of the memory block selected as the victim block for garbage collection. In this case, the first part of the memory block may include the first page while the second part of the memory block may include the last page.

According to another embodiment, a process for checking data validity may be sequentially determined from the last page to the first page of the memory block selected as the victim block. In this case, the first part of the memory block may include the last page and the second part of the memory block may include the first page.

In a process of sequentially checking data validity from the first page or the last page in the memory block selected as the victim block, when the number of the first attribute data deducted after checking validity of data stored in a page becomes 0, the controller may include the remaining pages, i.e., the next page to the last page, of the memory block in the second part in which a process for checking data validity is not performed.

In another example, as described with reference to FIG. 10, when the remaining number of first attribute data, subtracted after the process for checking data validity, falls below a preset threshold, the next page to the last page of the memory block may be included in the second part in which the process for checking data validity on a page-by-page basis does not need to be performed for operational efficiency. According to an embodiment, a preset threshold may be determined to be within 1%. It may be great to move 100% valid data of a victim block to another memory block (e.g. a free block) through garbage collection. Further, it is also good (efficient) to avoid moving 1% or less than 1% of invalid to another memory block after the controller determines data validity from the first page to the last page of the victim block on a page-by-page basis. That is, when an adverse effect of migrating very small amounts of invalid data in garbage collection might be negligible, skipping or halting a process for data validity may be more efficient to reduce resources consumed for garbage collection.

According to an embodiment, when a valid page count (VPC) of a victim block is greater than a half of the total number of pages of the victim block, the first attribute may indicate that a piece of data is invalid. For example, when pieces of valid data are more than that of invalid data in the victim block, it is more advantageous to determine data validity on a page-by-page basis based on the invalid page count (IPC) in the victim block for garbage collection.

On the other hand, if the valid page count (VPC) for the victim block is less than a half (½) of a total page number of the memory block, the first attribute may indicate that a piece of data is valid. For example, when pieces of invalid data are more than that of valid data in the victim block, it is more advantageous to determine data validity on a page-by-page basis based on the valid page count (VPC) in the victim block for garbage collection.

Figure 14:
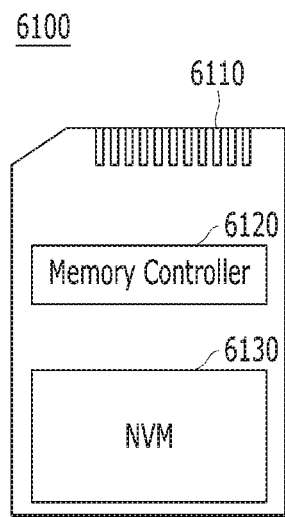
FIGS. 14 to 22 are block diagrams that schematically illustrate other data processing systems including a memory system in accordance with embodiments of the disclosure.

FIG. 14 is a diagram illustrating another example of a data processing system including a memory system. In other words, FIG. 14 schematically illustrates a memory card system 6100 to which the memory system in accordance with an embodiment is applied.

Referring to FIG. 14, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example but not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 3, and the memory device 6130 may correspond to the memory device 150 of the memory system 110 described with reference to FIGS. 1 and 5.

Thus, the memory controller 6120 may include a RAM, a processor, a host interface, a memory interface and an error correction component. The memory controller 130 may further include the elements shown in FIGS. 1 and 3.

The memory controller 6120 may communicate with an external device, for example, the host 102 of FIG. 1 through the connector 6110. For example, as described with reference to FIGS. 1 to 3, the memory controller 6120 may be configured to communicate with an external device according to one or more of various communication protocols, such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices, particularly mobile electronic devices.

The memory device 6130 may be implemented by a nonvolatile memory (NVM). For example, the memory device 6130 may be implemented by various nonvolatile memory devices, such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and/or a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may be so integrated to construct a solid state drive (SSD). In another embodiment, the memory controller 6120 and the memory device 6130 may be integrated to construct a memory card, such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and/or a universal flash storage (UFS).

Figure 15:
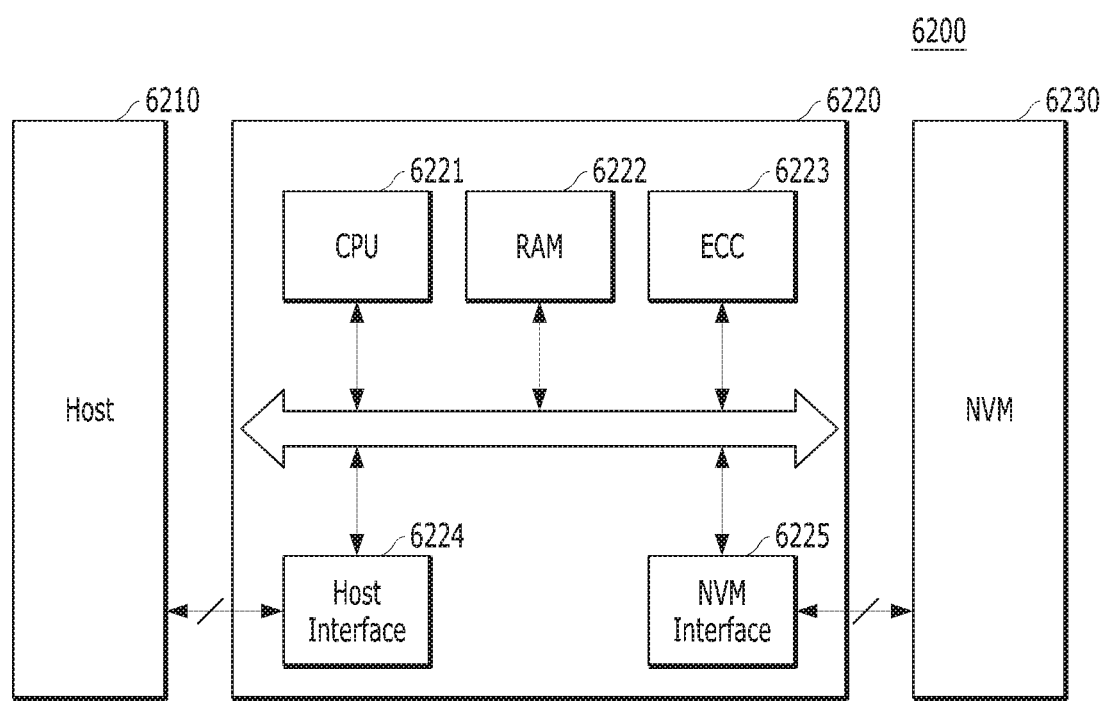

FIG. 15 is a diagram schematically illustrating another example of a data processing system 6200 including the memory system in accordance with an embodiment.

Referring to FIG. 15, the data processing system 6200 may include a memory device 6230 having one or more nonvolatile memories and a memory controller 6220 for controlling the memory device 6230. The data processing system 6200 may serve as a storage medium such as a memory card (CF, SD, micro-SD or the like) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management, and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. Particularly, as the memory controller 6220 is configured to communicate with the external device through one or more of various communication protocols, the memory system and the data processing system in accordance with an embodiment may be applied to wired/wireless electronic devices, particularly a mobile electronic device.

Figure 16:
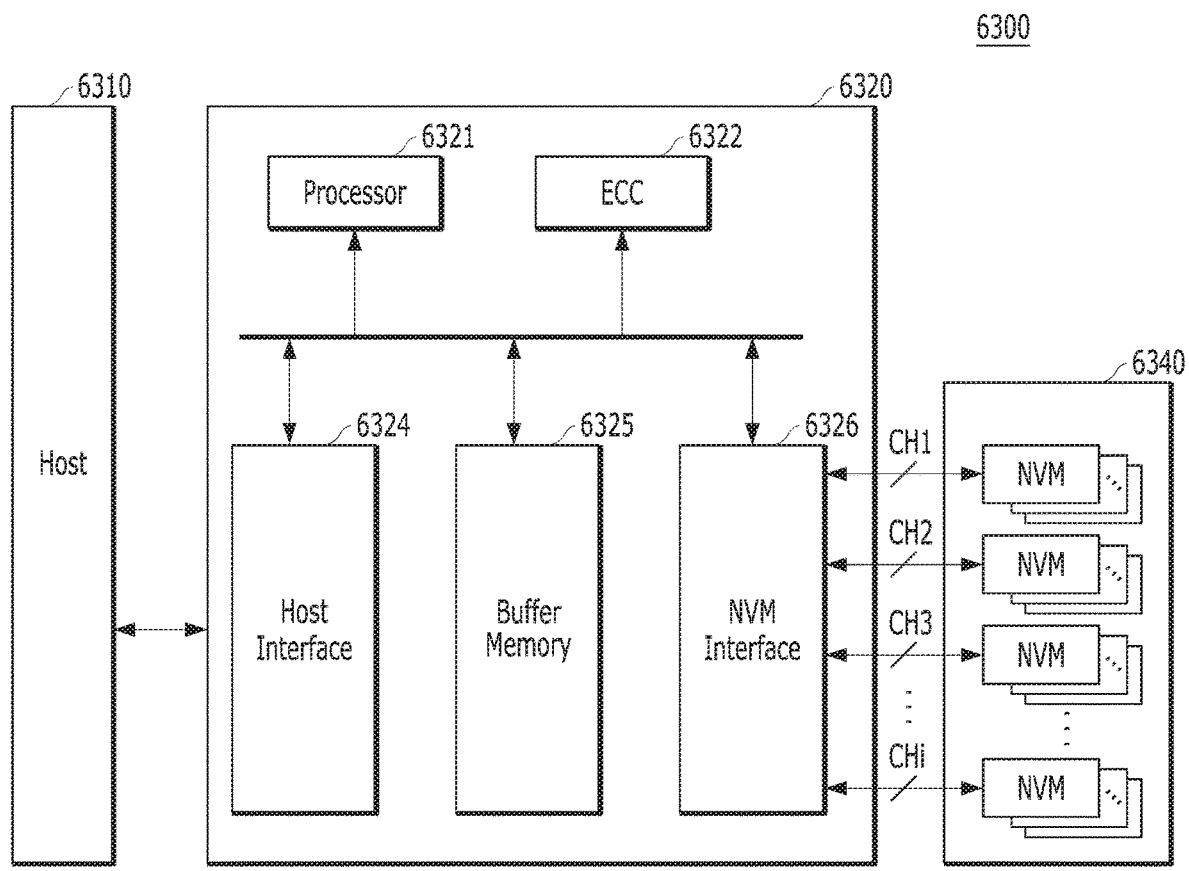

FIG. 16 is a diagram schematically illustrating another example of the data processing system including the memory system. In other words, FIG. 16 schematically illustrates a solid state drive (SSD) 6300 to which the memory system in accordance with an embodiment is applied.

Referring to FIG. 16, the SSD 6300 may include a controller 6320 and a memory device 6340 including a plurality of nonvolatile memories. The controller 6320 may correspond to the controller 130 in the memory system 110 of FIGS. 1 and 2. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories, such as DRAM, SDRAM, DDR SDRAM, LPDDR SDRAM and GRAM or nonvolatile memories such as FRAM, ReRAM, SII-MRAM and PRAM. FIG. 16 illustrates that the buffer memory 6325 is disposed in the controller 6320. However, the buffer memory 6325 may be external to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 17:
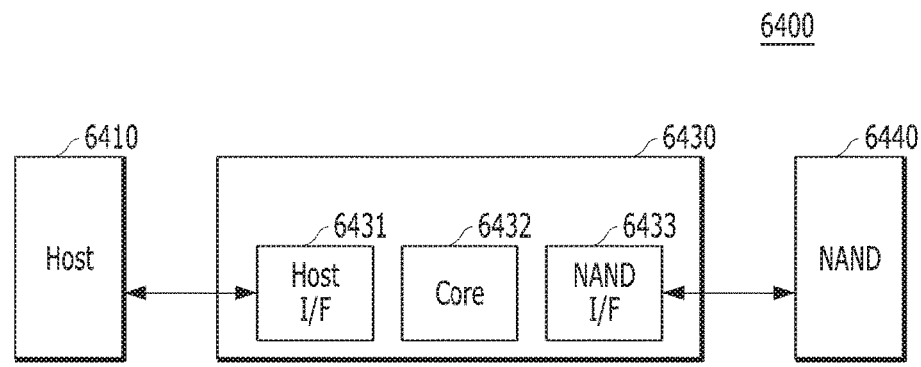

FIG. 17 is a diagram schematically illustrating another example of the data processing system including the memory system. That is, FIG. 17 schematically illustrates an embedded Multi-Media Card (eMMC) 6400 to which the memory system in accordance with an embodiment is applied.

Referring to FIG. 17, the eMMC 6400 may include a controller 6430 and a memory device 6440 embodied by one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

Figure 18:
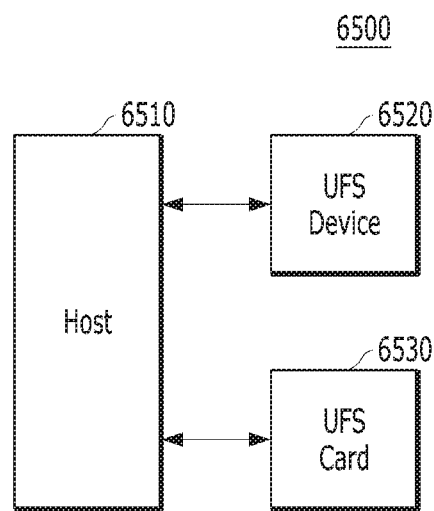
Figure 19:
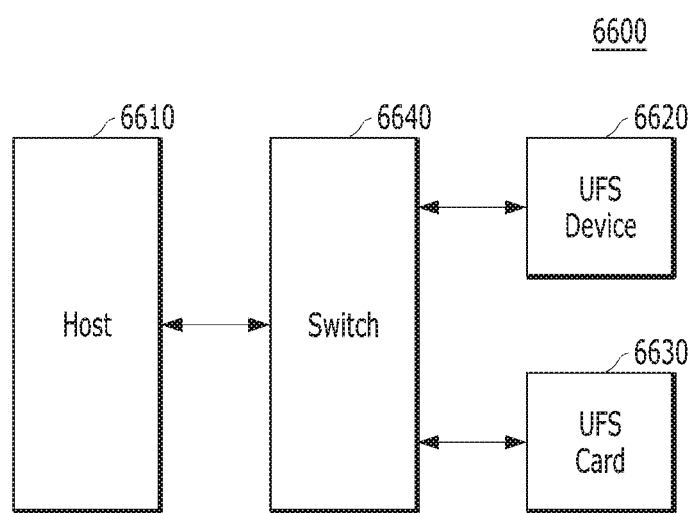
Figure 20:
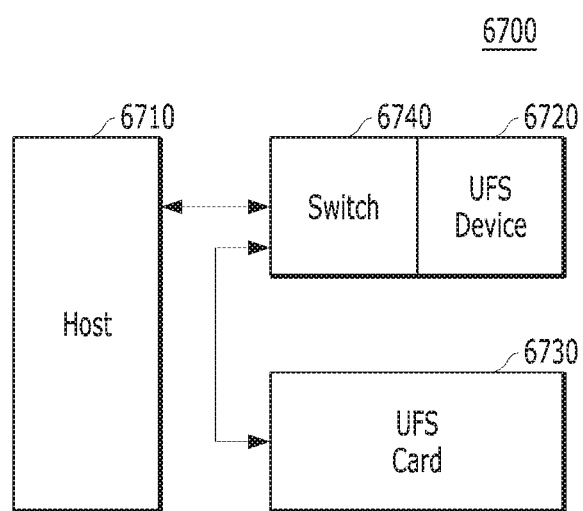

FIGS. 18 to 20 are diagrams schematically illustrating other examples of the data processing system including the memory system. That is, FIGS. 18 to 20 schematically illustrate universal flash storage (UFS) systems 6500, 6600, 6700, 6800 to which the memory system in accordance with embodiments is applied.

Referring to FIGS. 18 to 20, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 15 to 17, and the UFS cards 6530, 6630, 6730, 6830 may be embodied in the form of the memory card system 6100 described with reference to FIG. 14.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

In the UFS system 6500 illustrated in FIG. 18, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 18, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6410. The form of a star is a sort of arrangement where a single centralized component is coupled to plural devices for parallel processing. A plurality of UFS cards may be connected in parallel or in the form of a star to the UFS device 6520 or connected in series or in the form of a chain to the UFS device 6520.

In the UFS system 6600 illustrated in FIG. 19, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 19, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

In the UFS system 6700 illustrated in FIG. 20, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 20, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host, 6710 or connected in series or in the form of a chain to each other. Furthermore, a plurality of UFS cards may be connected in parallel or in the form of a star to the UFS device 6720.

Figure 21:
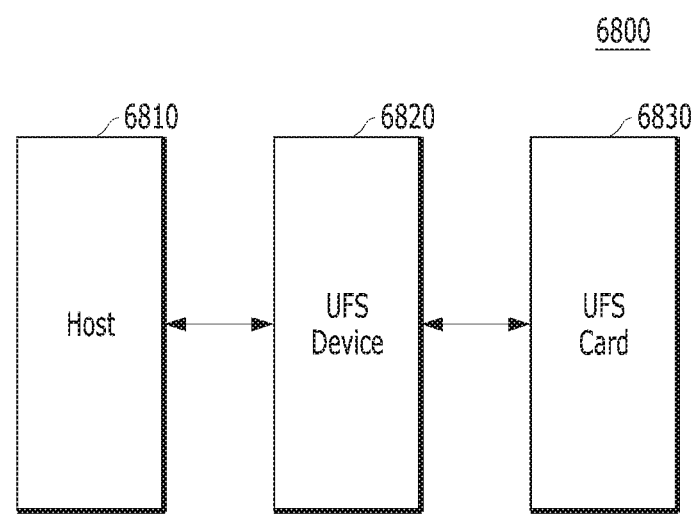

In the UFS system 6800 illustrated in FIG. 21, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 21, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 22:
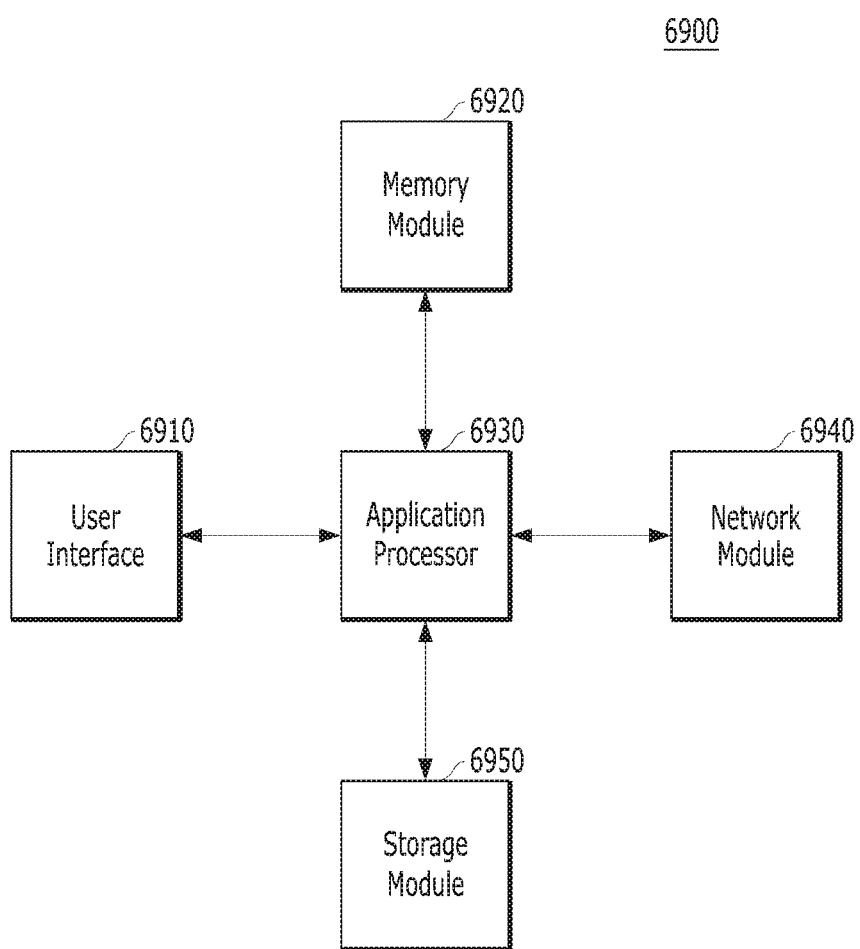

FIG. 22 is a diagram schematically illustrating another example of the data processing system including the memory system. Namely, FIG. 22 is a diagram schematically illustrating a user system 6900 to which the memory system in accordance with an embodiment is applied.

Referring to FIG. 22, the user system 6900 may include an application processor 6930, a memory module 6920, a network module 6940, a storage module 6950 and a user interface 6910.

Specifically, the application processor 6930 may drive components included in the user system 6900, for example, an OS, and include controllers, interfaces and a graphics engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM, such as DRAM, SDRAM, DDR SDRAM, DDR2 SDRAM, DDR3 SDRAM, LPDDR SDARM, LPDDR2 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols, such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS which are described above with reference to FIGS. 15 to 20.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In accordance with embodiments described above, a memory system, a data processing system, and an operation method thereof may significantly reduce the time required to search for, and extract, valid data during garbage collection so that the garbage collection may be performed more quickly in the memory system. For example, it is possible to greatly reduce the time of the validity check operation for verifying whether the stored data is valid. It may be easier to manage foreground or background operations that may be performed by valid data searching in the memory system. Thus, stability and reliability of the memory system may be improved.

Embodiments of the disclosure provide a method for efficiently searching for valid data through a method of searching for valid data or invalid data based on a valid page count of a memory block capable of storing a large amount of data, so that it is possible to greatly reduce a range of the memory block in which a validity check operation for determining whether or not data is valid.

While the disclosure has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
a memory device including plural memory blocks storing plural pieces of data classified by a first attribute and a second attribute different from the first attribute; and
a controller configured to determine whether each data stored in each page in a first part of a target memory block for garbage collection in the memory device has either the first attribute or the second attribute, to determine that all data stored in a second part of the memory block has one of the first attribute and the second attribute, based on a first attribute page count of the memory block and the number of pages storing data of the first attribute in the first part of the memory block, and to migrate data having one of the first attribute and the second attribute to another memory block.

2. The memory system according to claim 1, wherein the first attribute indicates that a piece of data is valid, and the second attribute indicates that the piece of data is invalid.

3. The memory system according to claim 2, wherein, when a value of subtracting the number of pages from the first attribute page count becomes zero at a specific page in the memory block, the next page to the last page belong to the second part.

4. The memory system according to claim 1, wherein the first attribute indicates that a piece of data is invalid, and the second attribute indicates that the piece of data is valid.

5. The memory system according to claim 1, wherein, when a ratio of a value of subtracting the number of pages from the first-attribute page count to the number of remaining pages in the memory block is less than a preset threshold, the next page to the last page belong to the second part.

6. The memory system according to claim 5, wherein the preset threshold is 1%.

7. The memory system according to claim 1, wherein the memory block is split into the first part and the second part, the first part includes the first page of the memory block, and the second part includes the last page of the memory block.

8. The memory system according to claim 1, wherein the first attribute indicates that a piece of data is invalid when a valid page count of the memory block is more than a half of a total page number of the memory block.

9. The memory system according to claim 1, wherein the first attribute indicates that a piece of data is valid when a valid page count of the memory block is less than a half of a total page number of the memory block.

10. The memory system according to claim 9, wherein the conoller is configured to check whether two different types of addresses regarding each data stored at a page in the first part are associated with each other to determine that each data has either the first attribute or the second attribute.

11. A method for operating a memory system, comprising:
checking whether two different types of addresses regarding each data stored at a page in a first part of a memory block in a memory device are associated with each other to determine whether a first or a second attribute data is stored in each page;
determining that all data stored in a second part of the memory block has one of the first attribute and the second attribute, based on a first attribute page count of the memory block and the number of pages storing data of the first attribute in the first part of the memory block; and
migrating data having one of the first attribute and the second attribute to another memory block.

12. The method according to claim 11, wherein the first attribute indicates that a piece of data is valid, and the second attribute indicates that the piece of data is invalid.

13. The method according to claim 11, wherein the first attribute indicates that a piece of data is invalid, and the second attribute indicates that the piece of data is valid.

14. The method according to claim 11, further comprising:
including the next page to the last page in the second part, when a value of subtracting the number of pages from the first attribute page count becomes zero at a specific page in the memory block.

15. The method according to claim 11, further comprising:
including the next page to the last page in the second part, when a ratio of a value of subtracting the number of pages from the first attribute page count to the number of remaining pages in the memory block is less than a preset threshold.

16. The method according to claim 15, wherein the preset threshold is 1%.

17. The method according to claim 11, wherein the memory block is split into the first part and the second part, the first part includes the first page of the memory block, and the second part includes the last page of the memory block.

18. The method according to claim 11, wherein the first attribute indicates that a piece of data is invalid when a valid page count of the memory block is more than a half of a total page number of the memory block.

19. The method according to claim 11, wherein the first attribute indicates that a piece of data is valid when a valid page count of the memory block is less than a half of a total page number of the memory block.

20. An apparatus for controlling a memory system including at least one processor and at least one memory including computer program code, wherein the at least one memory and the computer program code are configured, with the at least one processor, to cause the apparatus to:
check whether two different types of addresses regarding each data stored at a page in a first part of a memory block in a memory device are associated with each other to determine which of a first attribute data or a second attribute data is stored in each page;
determine that all data stored in a second part of the memory block has one of the first attribute and the second attribute, based on a first attribute page count of the memory block and the number of pages storing data of the first attribute in the first part of the memory block; and
migrate data having one of the first attribute and the second attribute to another memory block.

* * * * *